(12) United States Patent
Luo et al.

(10) Patent No.: US 7,035,461 B2
(45) Date of Patent: Apr. 25, 2006

(54) METHOD FOR DETECTING OBJECTS IN DIGITAL IMAGES

(75) Inventors: Jiebo Luo, Pittsford, NY (US); David Crandall, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 621 days.

(21) Appl. No.: 10/225,720

(22) Filed: Aug. 22, 2002

(65) Prior Publication Data

US 2004/0037460 A1    Feb. 26, 2004

(51) Int. Cl.
   *G06K 9/00*    (2006.01)
(52) U.S. Cl. ...................... 382/167; 382/164
(58) Field of Classification Search ........... 382/117, 382/118, 162, 164, 165, 167, 172, 173, 181, 382/190, 219, 220, 260, 266, 284; 358/515, 358/518
   See application file for complete search history.

(56) References Cited

U.S. PATENT DOCUMENTS

| | | | |
|---|---|---|---|
| 5,432,863 A | 7/1995 | Benati et al. ............... 382/167 |
| 5,710,833 A | 1/1998 | Moghaddam et al. ....... 382/228 |
| 6,252,976 B1 * | 6/2001 | Schildkraut et al. ........ 382/117 |
| 6,292,574 B1 | 9/2001 | Schildkraut et al. ........ 382/117 |
| 6,873,743 B1 * | 3/2005 | Steinberg .................... 382/275 |
| 2002/0126893 A1 * | 9/2002 | Held et al. .................. 382/167 |
| 2003/0007687 A1 * | 1/2003 | Nesterov et al. ............ 382/167 |
| 2003/0044063 A1 * | 3/2003 | Meckes et al. ............. 382/165 |
| 2003/0044070 A1 * | 3/2003 | Fuersich et al. ............ 382/190 |
| 2003/0044178 A1 * | 3/2003 | Oberhardt et al. .......... 396/158 |
| 2003/0223622 A1 * | 12/2003 | Simon et al. ............... 382/118 |

OTHER PUBLICATIONS

"Automatic Image Annotation Using Adaptive Color Classification" by Eli Saber, A. Murat Tekalp, Reiner Eschbach, and Keith Knox. Graphical Models and Image Processing, vol. 58, No. 2, Mar., 1996, pp. 115-126.

"On Critical Point Detection of Digital Shapes" by Pengfei Zhu and Paul M. Chirlian. IEEE Transactions on Pattern Analysis and Machine Intelligence, vol. 17, No. 8, Aug. 1995, pp. 737-748.

"Face Detection in Still Gray Images" by Bernd Heisele, Tomaso Poggio, Massimiliano Pontil. Massachusetts Institute of Technology Artificial Intelligence Laboratory and Center for Biological and Computational Learning Department of Brain and Cognitive Sciences. Memo No. 1687, May. 2000.

(Continued)

*Primary Examiner*—Andrew W. Johns
*Assistant Examiner*—Amir Alavi
(74) *Attorney, Agent, or Firm*—David M. Woods

(57) ABSTRACT

A method for detecting objects in a digital image includes the steps of generating a first segmentation map of the digital image according to a non-object specific criterion, generating a second segmentation map of the digital image according to an object specific criterion, and detecting objects in the digital image using both the first and second segmentation maps. In a preferred embodiment of the invention, the non-object specific criterion is a color homogeneity criterion and the object specific criterion is an object specific color similarity, wherein the object specific color is skin color and the method further comprises the step of detecting red-eye in the detected skin color regions.

26 Claims, 19 Drawing Sheets

OTHER PUBLICATIONS

"Body Plans" by D. A. Forsyth and M.M. Fleck. Proc. IEEE Conf. on Computer Vision and Pattern Recognition, 1997.

"Markov Random Field Models for Unsupervised Segmentation of Textured Color Images" by Dileep Kumar Panjwani and Glenn Healey. IEEE Transactions on Pattern Analysis and Machine Intelligence, vol. 17, No. 10, Oct. 1995.

* cited by examiner

230a

METHOD FOR DETECTING OBJECTS IN DIGITAL IMAGES

FIELD OF THE INVENTION

The invention relates generally to the field of digital image processing and, more particularly, to a method for detecting an object in a digital image.

BACKGROUND OF THE INVENTION

When flash illumination is used for the capture of an image sometimes the pupils of people in the image appear red. This is caused by light from the flash unit entering the pupil, multiply reflecting off the retina, and finally exiting back through the pupil. Because light is partially absorbed by capillaries in the retina, the pupil appears red in the image. This phenomenon is referred to as "redeye." The probability of redeye being observed increases the closer the flash unit is to the optical axis of the lens. Therefore, redeye is commonly observed in images captured by a small camera with an integral flash unit.

Commonly assigned U.S. Pat. No. 5,432,863, which is entitled "Automated Detection and Correction of Eye Color Defects Due to Flash Illumination" and which issued Jul. 11, 1995 in the names of Paul J. Benati, Robert T. Gray and Patrick A. Cosgrove, describes a user-interactive method for the detection of objects in an image that have the color characteristic of redeye. This method automatically detects candidate redeye pixels based on shape, coloration, and brightness. Although this presently known method of detecting redeye is satisfactory, it is not without certain drawbacks. For instance, the method disclosed in the '863 patent does not determine whether the candidate pixels are located in a face or are part of a human eye.

Commonly assigned U.S. Pat. No. 6,292,574, which is entitled "Computer Program Product for Redeye Detection" and which issued Sep. 18, 2001 in the names of Jay S. Schildkraut, Robert T. Gray and Jiebo Luo, describes a technique for detecting eye color defects of a subject in an image due to flash illumination based on detecting skin colored regions in a digital image, searching the skin colored regions for groups of pixels with color characteristic of redeye defect, and correcting color of the pixels based on a location of a found redeye defect. A drawback of this technique is its inability to either detect face regions in their entirety or, more specifically, to detect face regions as well separated skin colored regions.

Consequently, a need exists for a technique of detecting redeye that overcomes the above-described drawbacks.

SUMMARY OF THE INVENTION

The present invention is directed to overcoming one or more of the problems set forth above. Briefly summarized, according to one aspect of the present invention, a method for detecting objects in a digital image includes the steps of: generating a first segmentation map of the digital image according to a non-object specific criterion; generating a second segmentation map of the digital image according to an object specific criterion; and detecting objects in the digital image using both the first and second segmentation maps. In a preferred embodiment of the invention, the non-object specific criterion is a color homogeneity criterion and the object specific criterion is an object specific color similarity, wherein the object specific color is skin color and the method further comprises the step of detecting red-eye in the detected skin color regions.

The present invention has the advantage of increasing the detection rate of objects. In particular, for detecting faces with redeye defects, the detection rate is increased over the prior art method by increasing the correct detection of face regions in input digital images through the use of multiple segmentation maps.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

The present invention will be described as implemented in a programmed digital computer. It will be understood that a person of ordinary skill in the art of digital image processing and software programming will be able to program a computer to practice the invention from the description given below. The present invention may be embodied in a computer program product having a computer readable storage medium such as a magnetic or optical storage medium bearing machine readable computer code. Alternatively, it will be understood that the present invention may be implemented in hardware or firmware.

Figure 1:
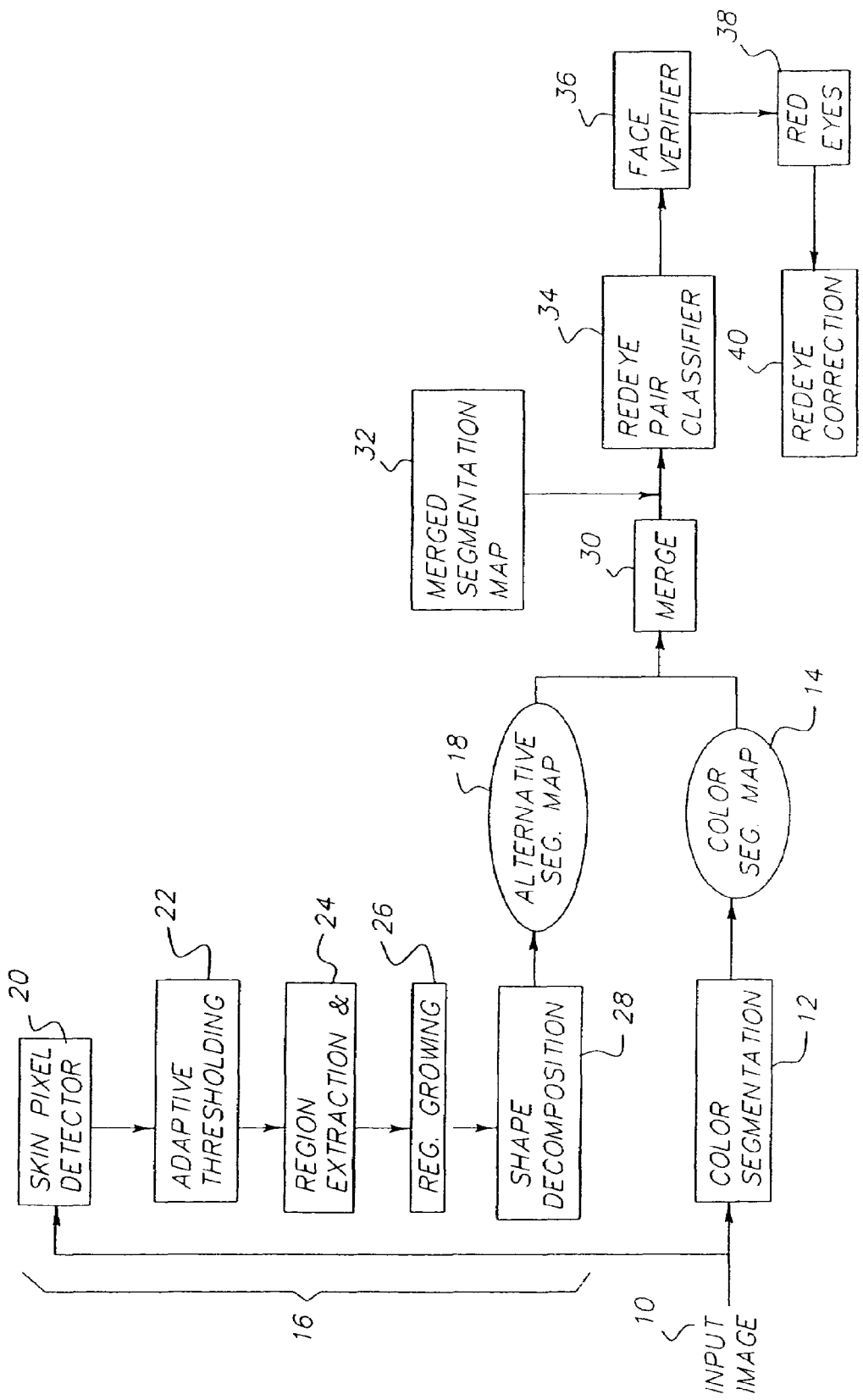
FIG. 1 is a block diagram of a preferred technique for detecting objects in an image according to the invention.

Referring first to FIG. 1, two separately generated segmentation maps are merged in a technique that utilizes the merged map to detect certain objects in an image. Such objects include, without limitation, redeye objects in an image, and the subsequent description will be phrased in relation to such objects. However, it should be understood that the technique could be used to detect other objects, with such minor variations as would be necessary and obvious to one of ordinary skill in such arts. As will be subsequently described in more detail, certain stages and portions of this technique have been drawn from the aforementioned U.S. Pat. No. 6,292,574, which is incorporated herein by reference.

The preferred technique shown in FIG. 1 receives a digital image 10, which includes, or at least potentially includes, one or more of the objects being sought in the detection process, such as the aforementioned redeye objects. The image 10 is processed in a color segmentation stage 12, where a non-object specific color segmentation process is applied to the original image to obtain a color segmentation map 14. The color segmentation stage 12 utilizes a method described in the aforementioned U.S. Pat. No. 6,292,574, which will be described hereafter in further detail, to identify segments according to a non-object specific criterion, which in the preferred embodiment is a color homogeneity criterion, specifically a skin-like average color.

The input digital image 10 is also processed in an object-specific path 16 according to an object specific criterion to produce an object-specific segmentation map 18, which functions as an alternative to the color segmentation map 14, and which presents complimentary information. In the preferred embodiment, the object specific criterion is an object specific color similarity, specifically a skin color associated with a facial object. More specifically, the segmentation map 18 is a skin-specific map that serves to identify segments of skin-colored pixels as a function of an identified skin object. The object-specific path 16 is composed of the following stages. A skin pixel detector stage 20 detects skin colored pixels in the digital image 10 by assigning a skin color belief value to each pixel in the image. An adaptive thresholding stage 22 then applies a threshold to the belief values generated by the skin pixel detector stage 20 to identify skin colored pixels. Continuous regions of skin colored pixels are extracted from the skin colored pixels by a region extraction stage 24. The extracted regions are then grown in a region growing stage 26 into more complete regions according to a continuity criterion for the belief values. The grown regions are then decomposed in a shape decomposition stage 28 into parts of simple shapes to generate the alternative segmentation map 18.

In a merging stage 30, the two separately generated segmentation maps, the non-object specific color segmentation map 14 and the object-specific alternative segmentation map 18, are merged into a merged segmentation map 32 that is used for object detection and location of specific objects. More specifically, a redeye pair classifier 34 uses regions in the merged segmentation map 32 as the basis for a redeye pair classifier to find candidate redeye pairs, which are then checked by a face verifier 36 before generating a list 38 of detected red eyes. The redeye pair classifier 34 utilizes a pattern matching method described in the aforementioned U.S. Pat. No. 6,292,574, which will be described hereafter in further detail. After face verification, the list 38 of detected red eyes is then submitted to a redeye correction stage 40, where corrections are applied to the red pixels to render the color of the redeye pixels as a more desirable shade.

Alternatively, the objects, e.g., redeye objects, may be separately detected in the non-object specific color segmentation map 14 and the object-specific alternative segmentation map 18 by applying the pattern matching method described in the aforementioned U.S. Pat. No. 6,292,574 separately to each of the maps 14 and 18, respectively, and then merging the detected objects. Then, after face verification by the face verifier 36, the list 38 of detected red eyes is submitted to the redeye correction stage 40.

Figure 2:
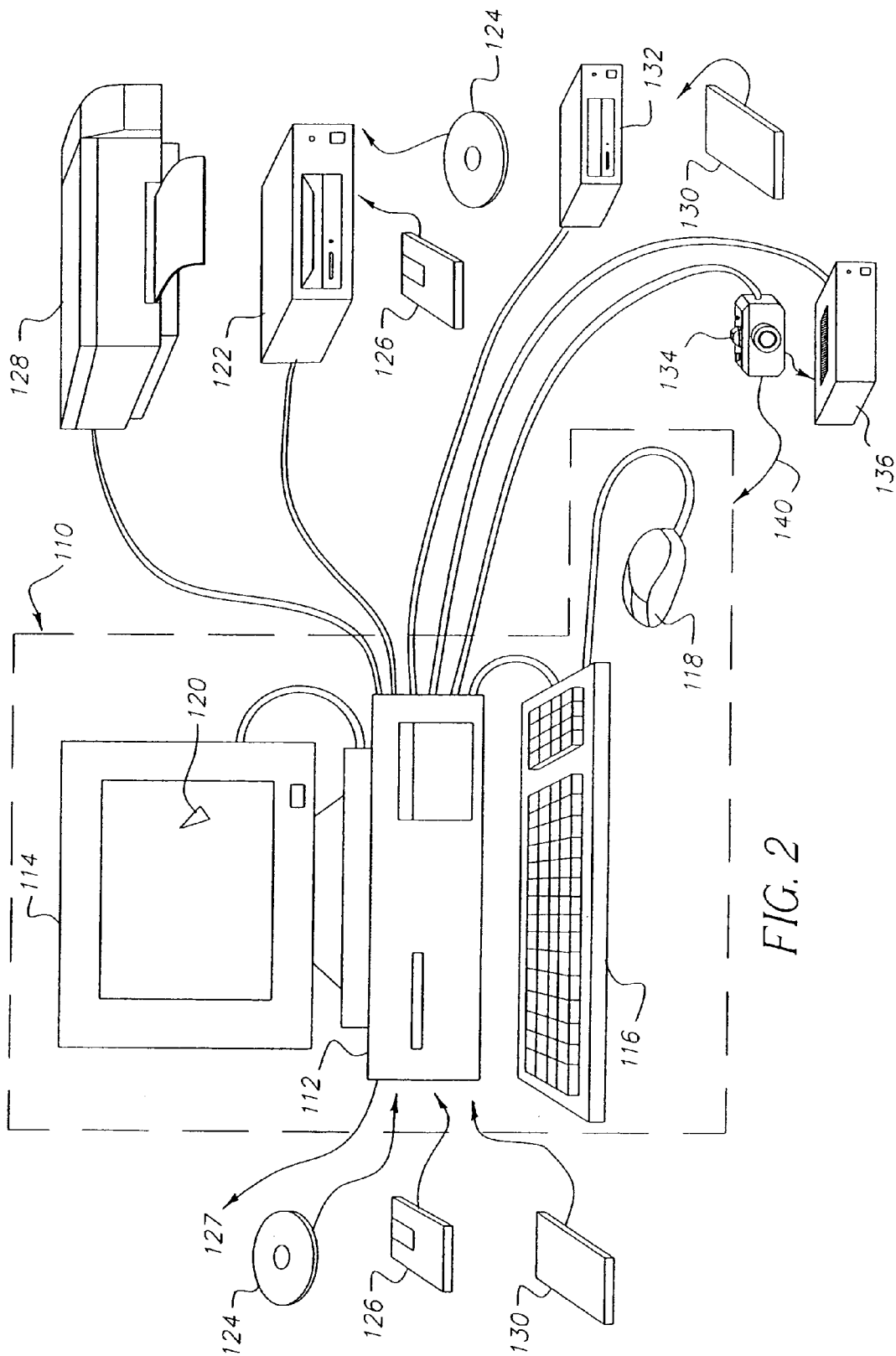
FIG. 2 is a pictorial diagram of a computer system for implementing the present invention.

Referring to FIG. 2, there is illustrated a computer system 110 for implementing the present invention. Although the computer system 110 is shown for the purpose of illustrating a preferred embodiment, the present invention is not limited to the computer system 110 shown, but may be used on any electronic processing system such as found in computers, kiosks, retail or wholesale photofinishing, or any other system for the processing of digital images. The computer system 110 includes a microprocessor-based unit 112 for receiving and processing software programs and for performing other processing functions. The computer system 110 can be, for example, a Sun Sparc Station. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 122 is connected to the microprocessor based unit 112 for receiving software programs and for providing a means of inputting the software programs and other information to the microprocessor based unit 112 via a compact disk 124, which typically includes a software program. In addition, a floppy disk 126 may also include a software program, and is inserted into the microprocessor-based unit 112 for inputting the software program. Still further, the microprocessor-based unit 112 may be programmed, as is well known in the art, for storing the software program internally. The microprocessor-based unit 112 may also have a network connection 127, such as a telephone line, to an external network, such as a local area network or the Internet. The network can be, for example, a local area network with sufficient capacity to handle large digital images. A printer 128 is connected to the microprocessor-based unit 112 for printing a hardcopy of the output of the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of the image on the display 114. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera 134 or a scanner 136 (for example, by scanning an original, such as a silver halide film). The digital camera 134 may also download images to the computer system through a communications link 140 (e.g., an RF or IR link). In accordance with the invention, the object detection algorithm disclosed in the preferred embodiment of the invention may be stored in any of the storage devices heretofore mentioned and applied to images in order to generate the two separately generated segmentation maps, the non-object specific map 14 and the object-specific map 18, which are merged into the merged segmentation map 32 and used for object detection and location of specific objects, especially redeye objects.

The object detection algorithm disclosed in the preferred embodiment of the present invention may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., PDA or cellphone that can be used as a processing unit, a display unit, or a unit to give processing instructions), and as a service offered via the World Wide Web.

In each case, the algorithm may stand alone or may be a component of a larger system solution. Furthermore, the interfaces with the algorithm, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the algorithm itself can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

Figure 3:
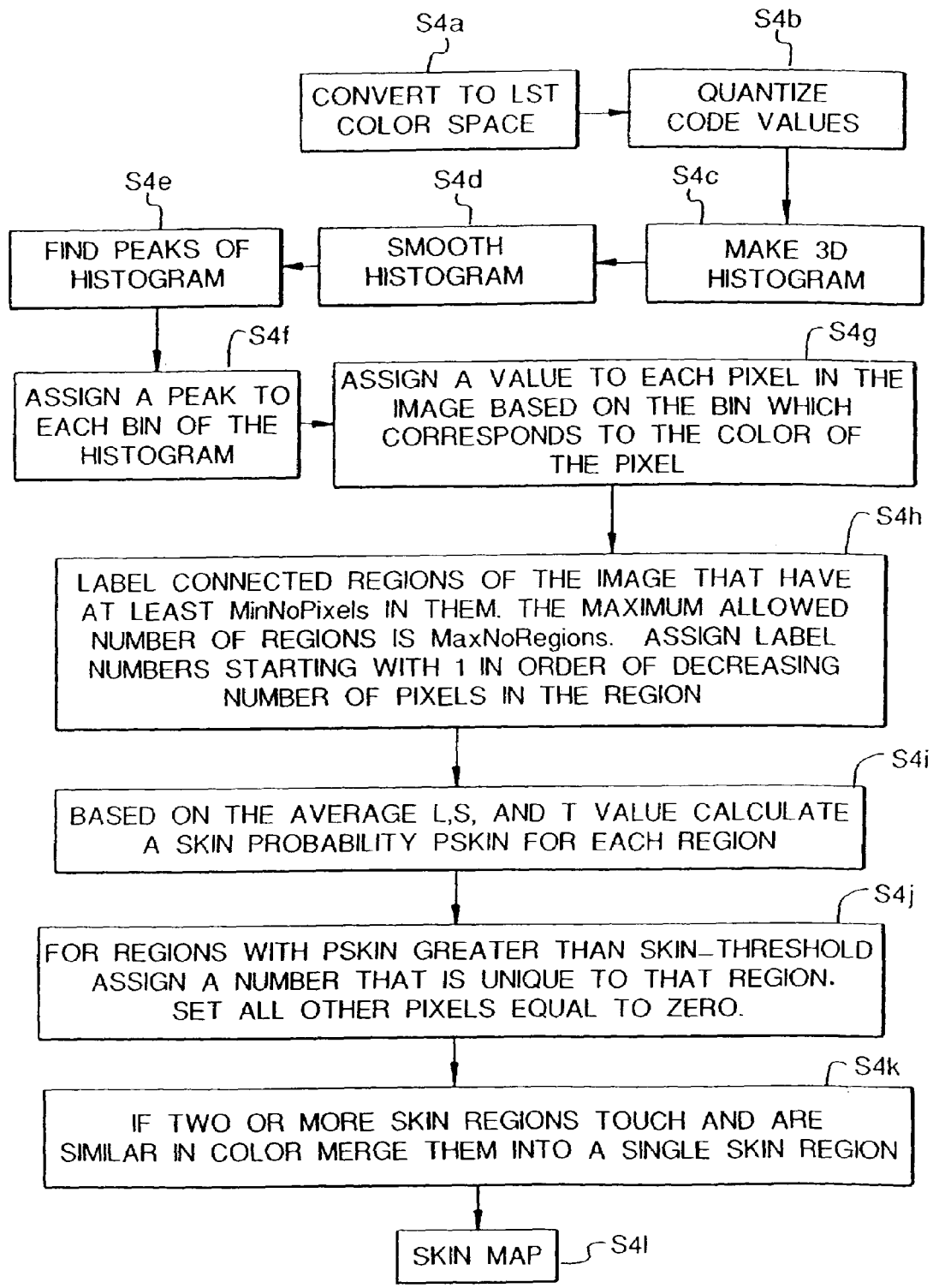
FIG. 3 is a detailed flowchart of the method for generating the color segmentation map composed of continuous skin colored regions as shown in FIG. 1.

Referring now to FIG. 3, there is illustrated a detail flowchart of the method for implementing the color segmentation stage 12, as described in the aforementioned U.S. Pat. No. 6,292,574, for identifying all separate continuous skin colored regions in the image 10. First, the red, green, and blue values of the color image are converted into LST color space S4$a$ using the relations:

$$L = \frac{1}{\sqrt{3}}(R + G + B)$$

$$S = \frac{1}{\sqrt{2}}(R - B)$$

$$T = \frac{1}{\sqrt{6}}(R + B - 2G)$$

where R, G, and B, are the red, green, and blue code value of a pixel in the color image 10, respectively.

The next step is to build a three-dimensional histogram. In order to reduce the size of the histogram, first, the L, S, and T code values are quantized by dividing them by 8.0×sqrt(3), 2.0, and 2.0, respectively S4$b$. These quantized code values are referred to as L', S', and T'. Each combination of L', S', and T' values is referred to as a "bin" of the histogram. The value of the histogram H(L'S', T') S4$c$ is equal to the number of pixels in the image that have quantized code values of L', S', and T'. An alternative way of stating this is that the histogram tell us the number of pixels in the image that fall into each bin. This number is referred to as the value of the bin.

The histogram is smoothed S4$d$ by replacing the value of each bin by a weighted average of the value of that bin and the values of immediate neighboring bins. Next, the peak values in the histogram are found S4$e$ and each bin in the histogram is assigned S4$f$ the peak value that is located closest to it. Finally, since each pixel in the color image has been assigned to a bin of the histogram and each bin has been assigned to a peak, a peak is assigned to each pixel in the color image S4$g$. The single band image in which a pixel's code value is equal to the number of the peak that it was assigned to is referred to as the segmented image.

Continuous regions in the segmented image that have the same code value are likely to correspond to an object or part of an object in the color image. A unique number (label) is assigned to all such regions in the segmented image S4$h$. The numbers are sequentially assigned starting with 1 for the region with the greatest number of pixels. The single band image in which code values correspond to the label of the region that the pixel belongs to is called the labeled image.

The program then decides which of the continuous regions in the segmented image corresponds to a region in the color image that has a color that is typical of human skin. The average L, S, and T code values of each region is calculated and, based on this, each region is assigned a score $P_{skin}$ S4$i$. A high value of $P_{skin}$ indicates that the region is of a color that is typical of human skin. Alternatively, a low number indicates that the color of the region is atypical of skin. Regions for which $P_{skin}$ exceeds a threshold $T_{skin}$ of 0.10 are referred to as skin-colored regions S4$j$.

One final step is necessary to associate each face in the color image with a single skin colored region. The process described above will often result in a single face being associated with more that one skin colored region because due to complexion, shadows, and etc., the color of the face is not uniform. Two skin colored regions are merged into a single skin colored region if two conditions are satisfied S4$k$. The first condition requires that the two regions be interconnected. A pixel in region i has a connection to region j if a pixel belonging to region j is one of the eight nearest neighbor pixels. A function Q(i, j) is calculated which is proportional to the number of connections between pixels of region i and j. The function is normalized so that Q(i, i) is equal to 1.0. If Q(i, j) exceeds the threshold MinMergerFraction regions i and j will be merged into a single region if the second condition is also satisfied, for example a threshold of 0.005 may be used. The second condition is that the distance between the colors of the regions i and j given by $$D_{color} = ((L_i - L_j)^2 + (S_i - S_j)^2 + (T_i - T_j)^2)^{\frac{1}{2}}$$

must be less than MaxMergeColorDistance which is set equal to 40.0.

The process of merging skin colored regions begins with the smallest region which, if the two conditions are satisfied, is merged with a larger region. If region i is merged with larger region j it may then happen that region j gets merged with an even larger region k. When this occurs regions i, j, and k are merged into a single region. Note that regions i and k may be merged together even though the above two conditions are not satisfied for these two regions. They are merged because of their mutual connection to region j.

Figure 4:
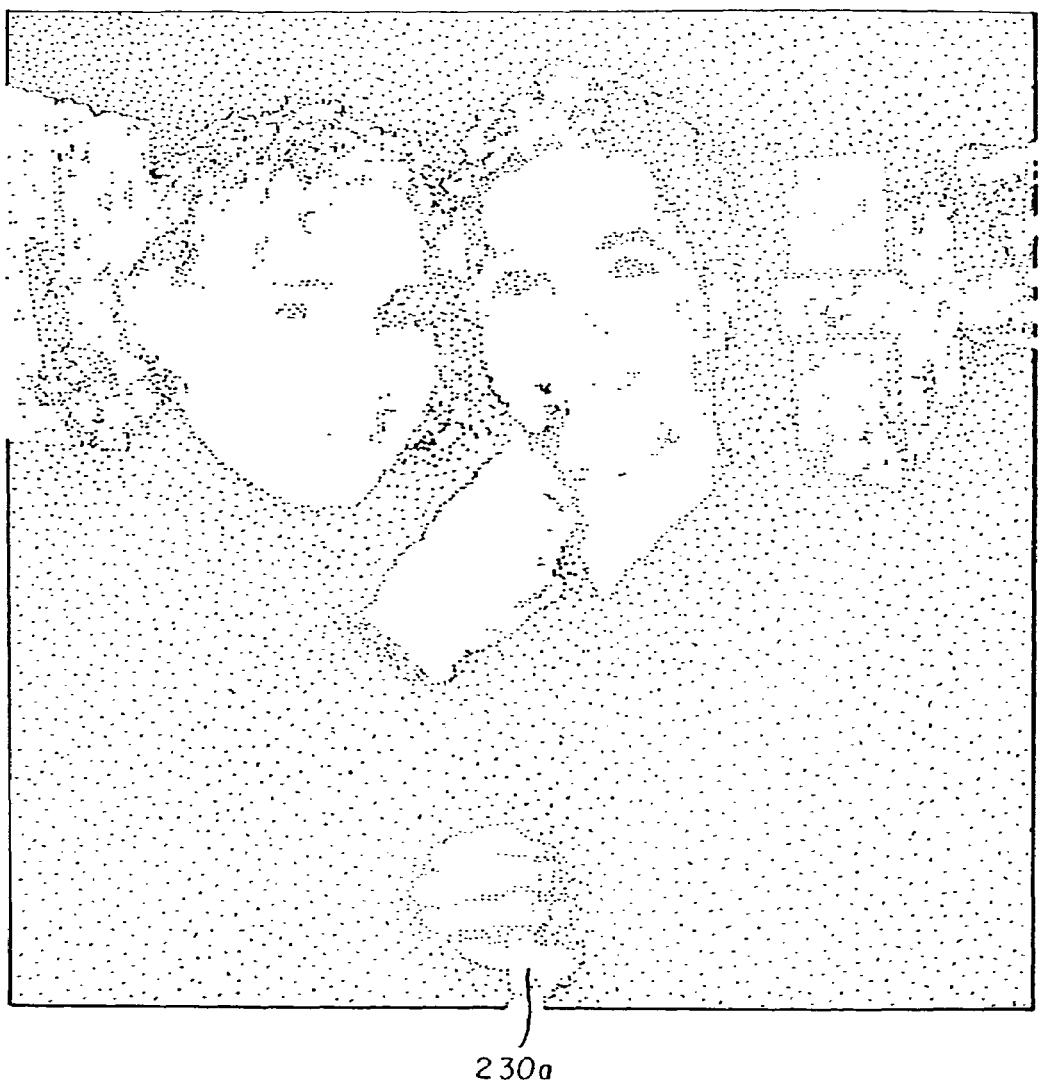
FIG. 4 is a pictorial representation of the color segmentation map generated according to the method of FIG. 3.

The result of skin color detection is a map of the skin colored regions in the color image S4l. Areas that are not skin colored are given a code value of zero. The separate continuous skin colored regions are numbered consecutively in order of decreasing region size beginning with the number 1. FIG. 4 shows a map of the skin colored regions 230a in a typical image of two persons.

According to the present invention, the object-specific segmentation map 18 is used additionally in the present invention to provide complimentary information. This object-specific or skin-specific segmentation map is generated according to the aforementioned stages 20, 22, 24, 26, and 28 described generally in connection with FIG. 1. Further detail is provided on these stages in the following paragraphs.

In particular, skin colored pixels in the digital image are detected in the skin pixel detector stage 20 by first assigning a skin color belief value to each pixel based on a predetermined color similarity measure between the color intensity values of a pixel and predetermined skin color intensity values. The result is a skin probability map consisting of skin probability or skin belief values for all pixels in the digital image. In the preferred embodiment of the present invention, the same process for calculating the score $P_{skin}$ and the color distance $D_{color}$ is applied to the color of each pixel in the original digital image instead of the average color of a contiguous region.

There are a few common ways to choose a threshold for the adaptive thresholding stage 22 in order to create a binary map from the skin probability map provided by the skin pixel detector 20, including the following:

A universal threshold can be obtained from the ROC (receiver operating characteristic) based on the training data. In general, it is chosen to maximize the detection rate while minimizing the false positive rate. Therefore, the corresponding operating point is usually the closest point on the ROC to the corner that represents 100% detection rate and 0% false positive rate (see E. Saber, A. M. Tekalp, R. Eschbach and K. Knox, "Automatic image annotation using adaptive color classification", CVGIP, Vol. 58, pp.115–126, 1996). In addition, the costs of false negative and false positive errors can be incorporated. For a given image, the probability values of the pixels are compared to the fixed threshold. The major drawback of using a universal threshold is the total ignorance of the changing statistics in individual images. The optimal universal threshold determined on the training data as a collection does not necessarily guarantee that it is optimal for each individual image. It is not optimal for data outside the training set either. In addition, it is not necessarily the right choice if the overall object detection algorithm contains further processing beyond thresholding.

In order to achieve some degree of adaptivity to changing characteristics in images, one can first construct a histogram of the (quantized) probabilities in the image and then look for a distinctive valley at the low end of the histogram. The premise is that non-object pixels would form a distribution close to the zero probability end of the histogram while the object pixels form one or more distributions of mostly higher probabilities. Looking for a valley in the composite distribution is the logical choice for the threshold. In fact, Saber et al. initially explored this concept. However, in their study, the threshold is chosen to be the first valley encountered at the high end of the histogram, assuming that the true object pixels will form the distribution of the highest probability. This assumption is the logical choice if the thresholding operation makes the final decision on object detection. However, frequently in practice, this assumption can be violated: for example, it is likely that the ocean appears more like sky color than the sky itself on a hazy day on the beach, or the wood panels in the background appear more like skin color than the face in a picture taken with strong flash fired. Saber et al. also proposed to use the valley that is the attraction basin of the universal threshold, i.e., the valley that an imaginary ball initially positioned at the universal threshold would fall into. Saber et al. use a kernel designed to achieve a trade-off between attenuation of the high frequency components in the histogram to create more salient peaks/valleys, and localization of the peaks/valleys. Saber et al. use zero-crossings to locate peaks/valleys.

In general, the preferred embodiment employs a rather conservative threshold to preserve all candidates while trying to limit the amount of false positives. We have found that looking for valleys in the probability histogram often leads to an inadequate threshold. In general, the non-object pixels occupy the majority of the image area, resulting in an extremely dominant distribution close to zero probability. This non-object distribution often simply buries the distinctive valley we are looking for. The tendency is to have such a low threshold that significantly increases the amount of false positives.

It is reasonable to assume that the targeted object forms a boundary of large discontinuity from the background clutters. Such boundaries should exist, not necessarily as color or intensity discontinuities, but as discontinuities in the probability maps produced by running classification on the relevant features (color, texture, etc.). Therefore, what is critical to determination of an optimal threshold is whether the threshold can result in well-defined boundaries when they should be. Therefore, it becomes evident that we do not necessarily need to use all the samples in the image. In other words, using more samples does not necessarily increase the signal-to-noise ratio for locating peaks and valleys in the histogram.

In the case of object detection, we typically need to answer a "yes" or "no" question. In other words, a pixel belongs to either the object or the background. If we only consider the pixels that are on or around the boundary between the object and the background, that may be all we need. In doing so, the histogram would become less affected by the relative sizes of objects and the background. In addition, since it is approximately equally likely to pick pixels on either side of the boundary (translating into picking equal number of object and background samples), the histogram would contain peaks of approximately the same height, resulting in very salient valleys in between. We call such a histogram with salient peaks and valleys a salient histogram.

One issue with such a histogram is that it is built on very few samples. In general, an image would contain sparse discontinuities and even more so for a probability map. It is not unusual for such a histogram to have a large number of empty bins, giving rise to ambiguity about valley locations.

Figure 5A:
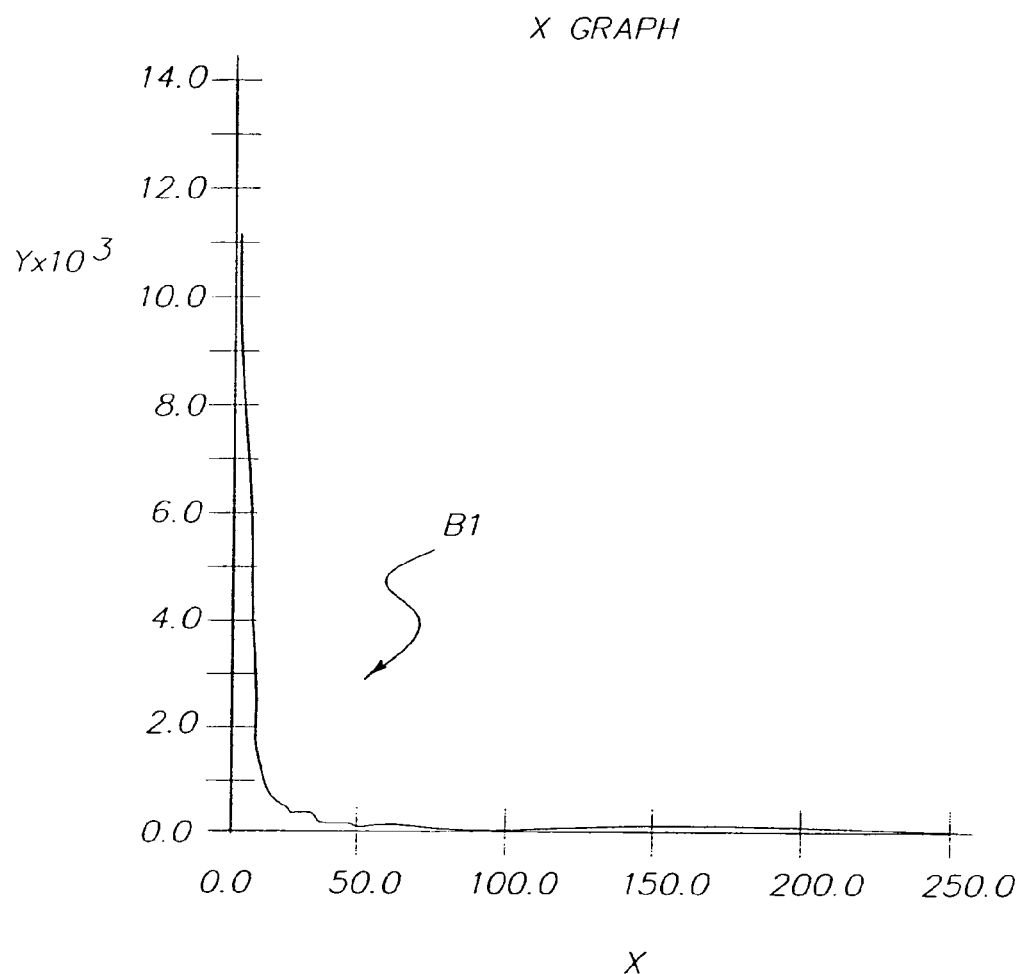
FIG. 5 is an example illustrating determination of adaptive threshold in the object-specific path as shown in FIG. 1 to produce an object-specific segmentation map.
Figure 5B:
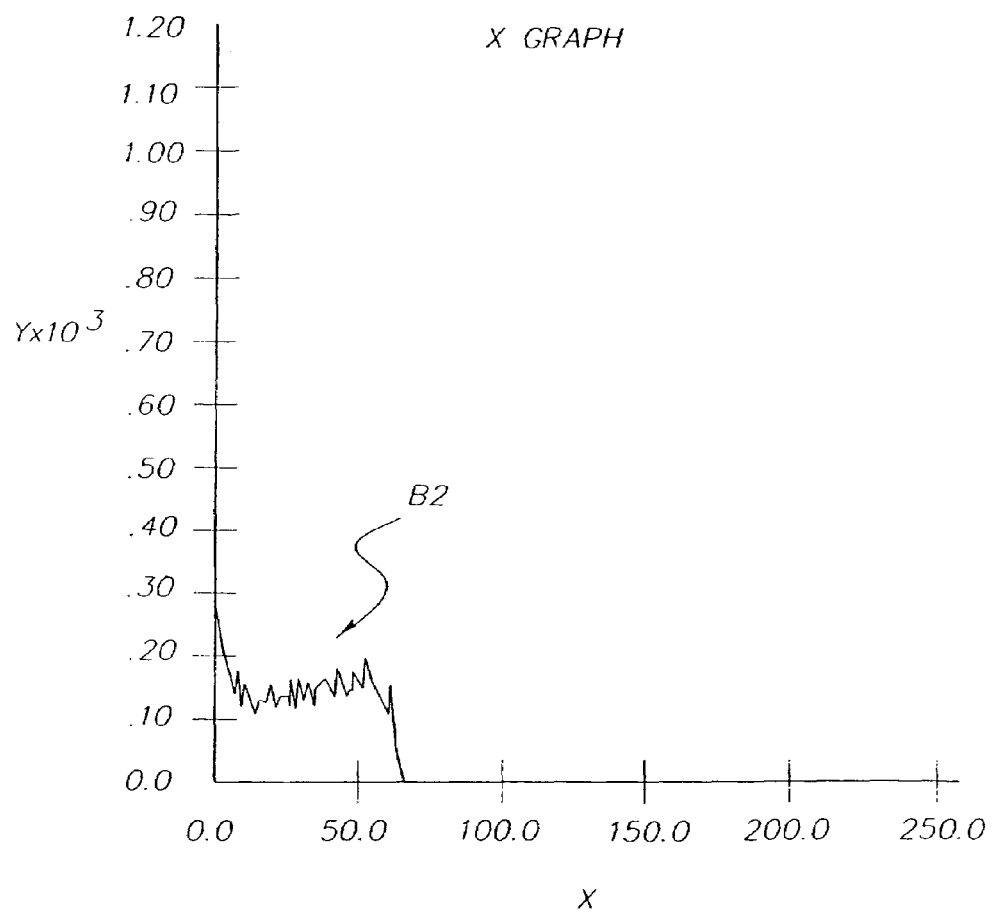
Figure 5C:
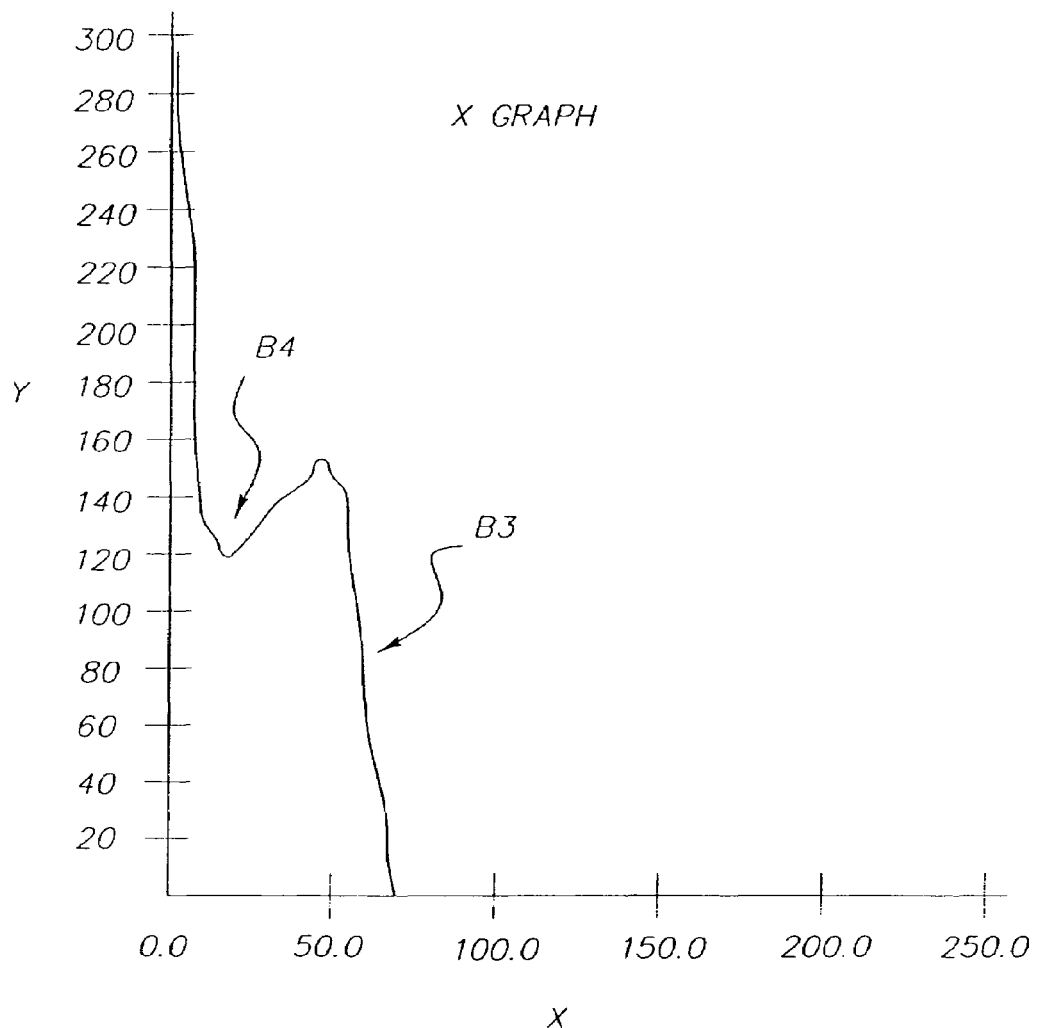

Initially, the probability interval of [0, 1] is quantized into 256 discrete bins for histogram counting. To deal with the sparseness of the salient histogram, the total number of histogram bins is reduced from 256 to 64 by uniform quantization. The result is a well-populated histogram B2. After certain amount of smoothing (e.g., 7-point running averaging), a clean, final salient histogram B3 is obtained. One example is shown in FIG. 5, where the original probability histogram B1 has no salient valleys and a salient valley B4 clearly exists in the final salient histogram B3. Note that both the vertical and horizontal axes of the plots are different, with the salient histogram having 64 bins and lower bin counts.

The following steps of the adaptive thresholding are used in a preferred embodiment of the present invention:
1. computing the Laplacian or the gradient of the probability map;
2. deriving a mask based on high gradient or Laplacian values;
3. constructing a histogram using only the high-gradient pixels as indicated by the mask;
4. quantizing the histogram to fewer number of well populated bins (e.g., from 256 bins to 64 bins);
5. applying a running average smoothing to the histogram to obtain a salient histogram containing salient peaks and valleys;
6. locating peaks and valleys in the salient histogram;
7. selecting the threshold as the appropriate valley (e.g., the first valley encountered at the low end of the salient histogram); and
8. adjusting the threshold value for histogram bin quantization (e.g., multiplying the valley value by 4 in the example used in step 4).

Let $i \in \{1,2, \ldots, N\}$ index image pixel locations. The probability value at p is denoted by p(i). Let the interval of [0,1] be quantized to K (e.g., 256) bins. The conventional histogram is computed by $$h[k]=h[k]+1, \text{ if } p[i]=k, i=1, 2, \ldots, N, k=0, 1, \ldots, K-1.$$

The Laplacian of a 2D function f(x,y) is a second-order derivative defined as $$\nabla^2 f = \frac{\partial^2 f}{\partial x^2} + \frac{\partial^2 f}{\partial y^2}$$

In a digital form, the Laplacian operator is given by a 3×3 kernel $$\begin{bmatrix} 0 & -1 & 0 \\ -1 & 4 & -1 \\ - & -1 & 0 \end{bmatrix}$$

The gradient of an image f(x,y) at location (x,y) is defined as $$\nabla f = [G_x G_y]^T = \left[ \frac{\partial f}{\partial x} \frac{\partial f}{\partial y} \right]^T$$

And its digital forms are two separable kernels $$G_x = \begin{bmatrix} 1 & 0 & -1 \\ 2 & 0 & -2 \\ 1 & 0 & -1 \end{bmatrix} \quad G_y = \begin{bmatrix} 1 & 0 & -1 \\ 2 & 0 & -2 \\ 1 & 0 & -1 \end{bmatrix}$$

And the magnitude of the gradient vector is $$G=[G_x^2+G_y^2]^{1/2} \approx |G_x|+|G_y|$$

After the adaptive threshold is determined and applied to the skin probability or belief values, the skin probability map becomes a binary map with skin pixels labeled by "1" and non-skin pixels labeled by "0". A connected component extraction process is used in the region extraction stage 24 to extract contiguous regions of skin pixels. This process is described in Sonka, Hlavac, and Boyle, *Image Processing, Analysis, and Machine Vision*, Brooks & Cole, 1999.

Figure 6:
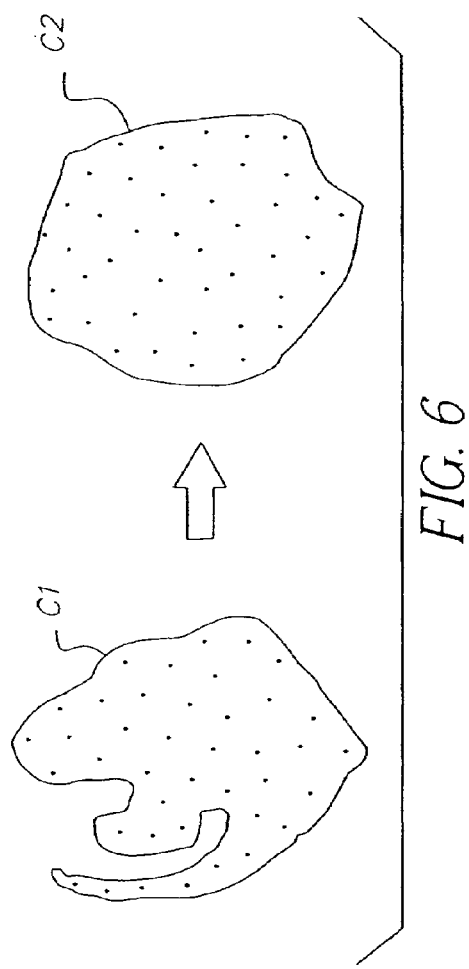
FIG. 6 is a graphical example illustrating region growing in the object-specific path as shown in FIG. 1 to produce the object-specific segmentation map.

For a reason that will become clearer later, each extracted region of skin pixels needs to be refined such that a more complete, more solid region is obtained. Often times the skin belief values of some pixels within a skin region fall below the threshold, resulting in an incomplete skin mask. Incomplete skin masks are undesirable for a subsequent shape decomposition process. Conventional color-based region growing proved risky in that "bleeding" or overgrowing can occur if the colors of certain background pixels happen to be close to those of the extracted skin pixels whose skin belief values are above the threshold. In the present invention, more robust region growing is performed in the region growing stage 26 based on similarity in belief values. In particular, starting from extracted skin regions (used as seed pixels), pixels with sub-threshold belief values but are spatially connected to the seed pixels are examined: if their belief values are above a bare minimum, e.g., 0.1 out of a possible maximum of 1.0, and the difference between their belief values and those of the spatially connected seed pixels is below a pre-determined threshold, these pixels are merged into the same region as the seed pixels. The effect of the belief-based region growing is illustrated in FIG. 6, where the initially incomplete face blob region C1 is refined to obtain a complete face blob region C2.

Figure 7:
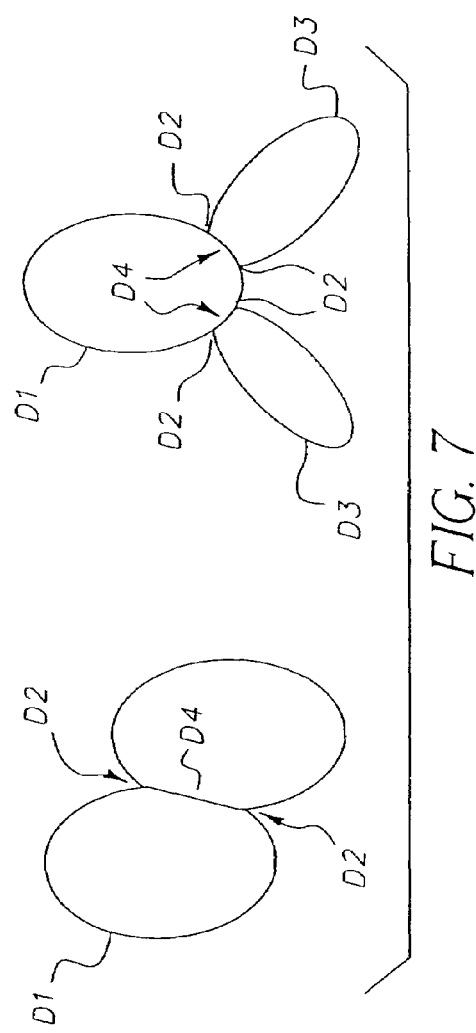
FIG. 7 is a graphical example illustrating shape decomposition in the object-specific path as shown in FIG. 1 to produce the object-specific segmentation map.

A common problem for detecting candidate face regions, or blobs, is referred to as "under-segmentation", where objects of skin color or of similar color are segmented into the same region as a face: including faces butted together, hands connected to the face, blonde hair connected to fair skin colored face, exposed shoulder/neck/chest connected to the face, furniture connected to face, clothing connect to the face, etc. Examples of typical under-segmentation problems are shown in FIG. 7.

To address this problem, shape-based parts decomposition is used in the shape decomposition stage 28 to cut a region of complicated shape into multiple parts regions in a preferred embodiment of the present invention. The effect of shape decomposition is illustrated in FIG. 7. In particular, for each connected region,
1. Follow outer contour D1 of the region;
2. Smooth the contour to remove noisy structures;
3. Find critical points D2 and D3 of high curvature along the smoothed contour;
4. Identify negative curvature critical points (NCP) D2
5. For each NCP, possibly choose another contour point to form a "cut" D4
6. Split regions at the cuts to produce simple, blob-like regions After contour following, the contour of each region has been represented as an ordered list of (x,y) coordinate pairs. Let i ∈ {1,2, ..., N} index this list of pairs. The contour is subsequently smoothed by converting the list into polar coordinates with respect to some fixed, arbitrary reference point (x', y'):

$$r_i = \sqrt{(x_i-x')^2+(y_i-y')^2}$$

$$\theta_i = \tan\left(\frac{y_i - y'}{x_i - x'}\right)$$

A low-pass filter is applied on each of the lists r and θ (for example, by applying a mean filter) to perform the contour smoothing. In the preferred embodiment of the invention, critical points of the smoothed contour are detected using the algorithm described in P. Zhu and P. Chirlian, On Critical-Point Detection of Digital Shapes, *IEEE Transactions on Pattern Analysis and Machine Intelligence*, 17(8): 737–748, August 1995. This algorithm attempts to identify contour points that are both local maxima in curvature and perceptually significant. A brief summary of the algorithm follows. First, all pixels that are local maxima in the angle or radius functions are identified, and placed in set M. Next, all points that are local maxima in distance from the line segment connecting the two neighboring M points are placed in set Γ. Sets M and Γ are merged to form a set of pseudocritical points $C_0$. A measure of the perceptual significance of a pseudocritical point, called the critical level, is defined based on the size of the triangle formed by a point and its two neighboring pseudocritical points. The critical levels of all points in $C_0$ are computed, and the point with the lowest critical level is removed. This process is performed iteratively until all points in $C_0$ have a critical level above a threshold (for example, 60). The resulting set $C_0$ is the set of critical points (CPS).

Note that an alternative critical point detection algorithm could be employed as an obvious modification to the present invention.

Curvature points having low (sharp) negative curvature are selected and placed in set NCPS. In particular, critical points with curvature C less than a threshold (e.g. –0.05) are chosen, with C defined as:

$$C(t) = \frac{x'(t)y''(t) - x''(t)y'(t)}{(x'(t)^2 + y'(t)^2)^{\frac{3}{2}}}$$

where x'(t) and y'(t) are the first derivatives and x"(t) and y"(t) are the second derivatives with respect to the parameter t. In the discrete case, the evaluation of this function can be approximated by computing the derivatives with respect to a small neighborhood:

$$C((x_i, y_i)) = \frac{(x_{i+1})(y_{i+2} - 2y_i + y_{i-2}) - (y_{i+1} - y_{i-1})(x_{i+2} - 2x_i + x_{i-2})}{((x_{i+1} - x_{i-1})^2 + (y_{i+1} - y_{i-1})^2)^{\frac{3}{2}}}$$

Despite the heuristics used in the critical point detection algorithm, it can happen that multiple elements of set NCPS are located close together around a single perceptual critical point. A local non-maximum curvature suppression step is used to eliminate this redundancy. The contour is scanned to find groups of two or more neighboring elements of NCPS that have no other elements of CPS in between. The contour distance between neighboring NCPS must be no more than one-half of dist_threshold to be considered part of the same group. (dist_threshold is adaptively set based on characteristics of the region in question. For example, it can be equal to one-half the minimum dimension of the region's minimum bounding box, unless the fill factor of the region is greater than one-half, in which case it is set to 60% of the minimum dimension of the minimum bounding box. In either case dist_threshold is not permitted to be greater than one-third of the minimum dimension of the size of the image.) The elements of NCPS with local minimum curvature within each group are removed. The remaining points are called salient negative curvature contour points and placed in set SNCPS.

The next step is to identify candidate pairs for each SNCP that together could form the endpoints of a potential cut. For each SNCP, all other contour points are considered candidates, with a series of filters discarding the points that are not good pairs. Suppose we are considering whether to pair a point $P_S$ ∈ SNCPS with another contour point $P_O$. In the preferred embodiment of the present invention, the following filters are used:

1. Euclidean distance filter: $P_O$ is discarded if dist($P_O,P_S$) >dist_threshold where dist is the Euclidean distance function. This filter removes points that are too far away to be viable pairs.

2. Cut salience filter: $P_O$ is discarded if $$\frac{dist(P_o, P_s)}{Cdist(P_o, P_s)} > \frac{1}{3} \text{ or } \frac{Cdist(P_o, P_s)}{2.0} < dist\_threshold$$

where dist is the Euclidean distance function and Cdist is the minimum distance along the contour between two points. This filter eliminates cuts that are not perceptually salient because the size of the cut is large compared to the size of the shape feature.

3. Tangent vector filter: The tangent vectors at $P_S$ and $P_O$ are compared and $P_O$ is removed if the difference between the angles of the vectors is less than ang_threshold degrees. Note that the convention is that the tangent vectors point in the same direction as the direction of contour following. This filter is motivated by the observation that the two ends of reasonable cuts always have nearly opposite tangent vectors. The ang_threshold threshold is normally set to 90 degrees. However if the curvature (defined above) at $P_S$ is high, the tangent angle is noisy. Therefore if the curvature at $P_S$ is below a threshold (e.g. –0.2), ang_threshold is raised (e.g. to 135 degrees).

4. Normal vector filter: $P_O$ is removed from consideration if the angle between the vector $P_S P_O$ and the normal vector at $P_S$ is less than ang_thresh degrees. It is observed that ideally, the two vectors will point in opposite directions. As described above, ang_threshold is automatically set based on the curvature at point $P_S$.

Let the set of pixels passing through the filter for $P_S$ ∈ SNCPS be called $S_C$. If $S_C$=Ø, no cut is formed with $P_S$. Otherwise, one or more candidate points are chosen to form cuts with $P_S$. Since elements of SNCPS represent major concave shape features, it is often best to choose a candidate pair point that is also an element of SNCPS. A set $S_N$ containing contour points near an SNCP is defined:

$$P \in S_N \text{ iff } \exists Q \in SNCP \text{ such that } Cdist(P, Q) < 5$$

where Cdist is the contour distance function defined earlier. The point $P1 \in S_C$ is then chosen that minimizes the Euclidean distance $D1=\text{dist}(P1, P_S)$. If set $S_N$ is not empty, we also choose the point $P2 \in S_N$ that minimizes the Euclidean distance $D2=\text{dist}(P2, P_S)$. If $D2<(1.1.)D1$, the closest SNCP to P2 is chosen as the final cut pair point. Otherwise, P1 is chosen.

As an obvious modification to the present invention, multiple candidate points could be chosen for each $P_S \in$ SNCPS.

The candidate pair selection and cut selection steps are repeated for all SNCPS in the region. The result is a list of zero or more line segments that specify the cuts. The cuts are applied to the segmentation map by drawing the line segments on the buffer of the segmentation map with a unique code value, and then performing connected component analysis.

Figure 8:
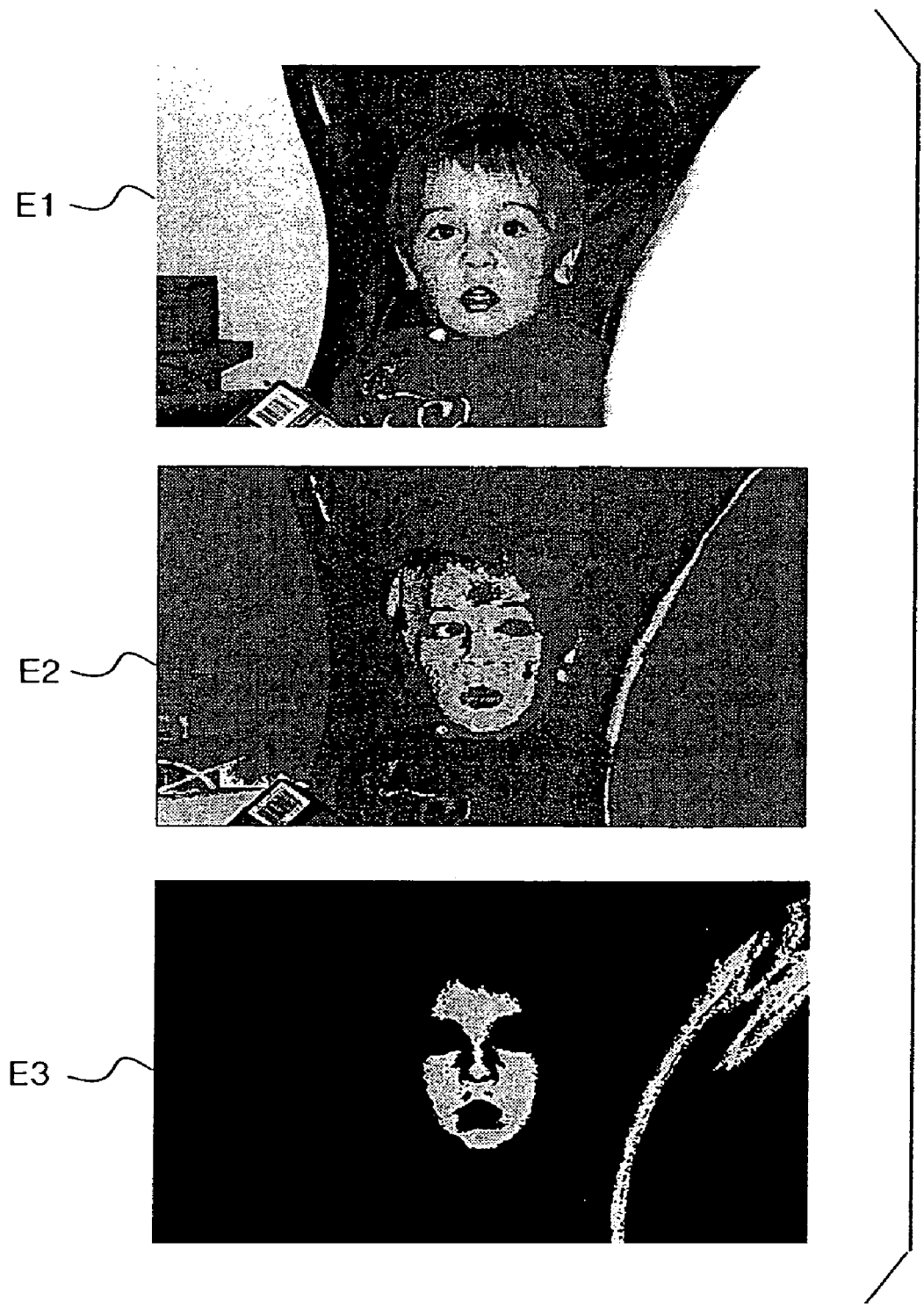
FIG. 8 is a graphical example illustrating one digital image, one non-object specific segmentation map, and one object-specific segmentation map.

Referring now to FIG. 8, there is shown an illustrative example of an original digital input image E1, a non-object specific segmentation map E2, and an object-specific segmentation map E3. The face of the subject is broken into two major segments in the object-specific segmentation map E3 because the colors of the missed pixels do not resemble those of skin colors, but the face region remains largely one segment in the non-object specific segmentation map E2 because the color of the pixels in the face are close to each other. The opposite may be true for a different image where a face is broken into multiple pieces in the non-object specific segmentation map E2 but remains one piece in the object specific segmentation map E3. This example illustrates the need to use multiple segmentation maps that sometimes provide different and complementary interpretations of the same scene.

Those skilled in the art will recognize that a special case of utilizing multiple segmentation maps is to produce different segmentation maps using different parameterization of the same segmentation method. Also, those skilled in the art will recognize that a special case of utilizing multiple segmentation maps is to dynamically choose one or more segmentation algorithms at run time from a battery of available segmentation algorithms.

Referring back to FIG. 1, the non-object specific segmentation map 14 (e.g., the map E2) and the object-specific segmentation map 18 (e.g., the map E3) are merged into the merged segmentation map 32, which is used for object detection and location in the redeye pair classifier 34 and the face verifier 36. Redeye pair object detection and location utilizes the method described in the aforementioned U.S. Pat. No. 6,292,574, which will be described in the following paragraphs in further detail, to identify the list 38 of detected red eyes.

Figure 9:
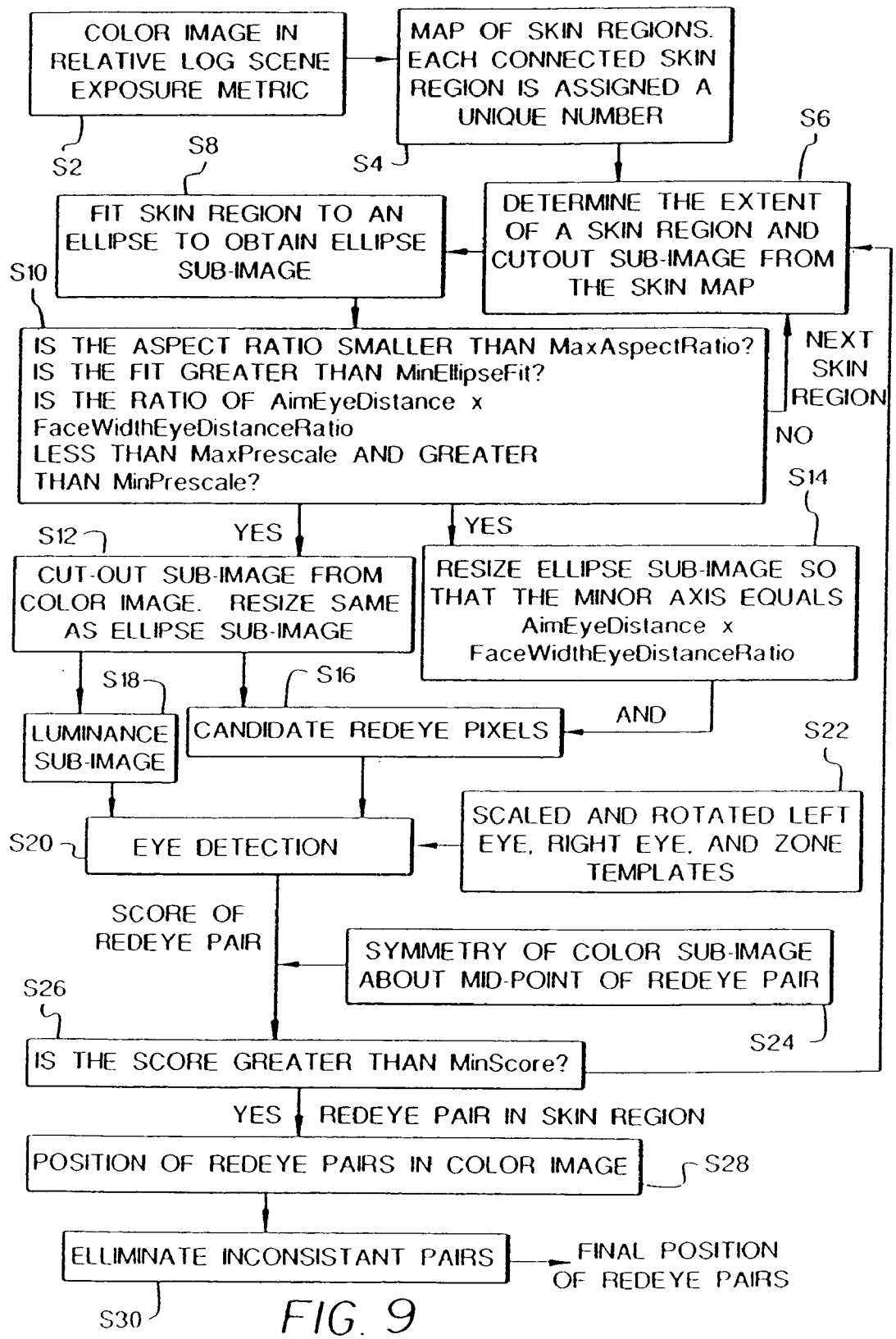
FIG. 9 is an overview flowchart of the software program of the redeye pair classifier shown in FIG. 1.

Referring to FIG. 9, there is illustrated an overview flowchart of the method utilized in the aforementioned U.S. Pat. No. 6,292,574, as applied to the present invention in order to perform redeye object detection and location in the redeye pair classifier 34. The illustrated process begins by identifying all separate continuous skin colored regions in the image S4; this step includes the aforementioned method for generating the merged map 32 from the non-object specific segmentation map 14 and the object-specific segmentation map 18. Subsequent steps S8 through S30 implement the redeye pair classifier 34.

Figure 10:
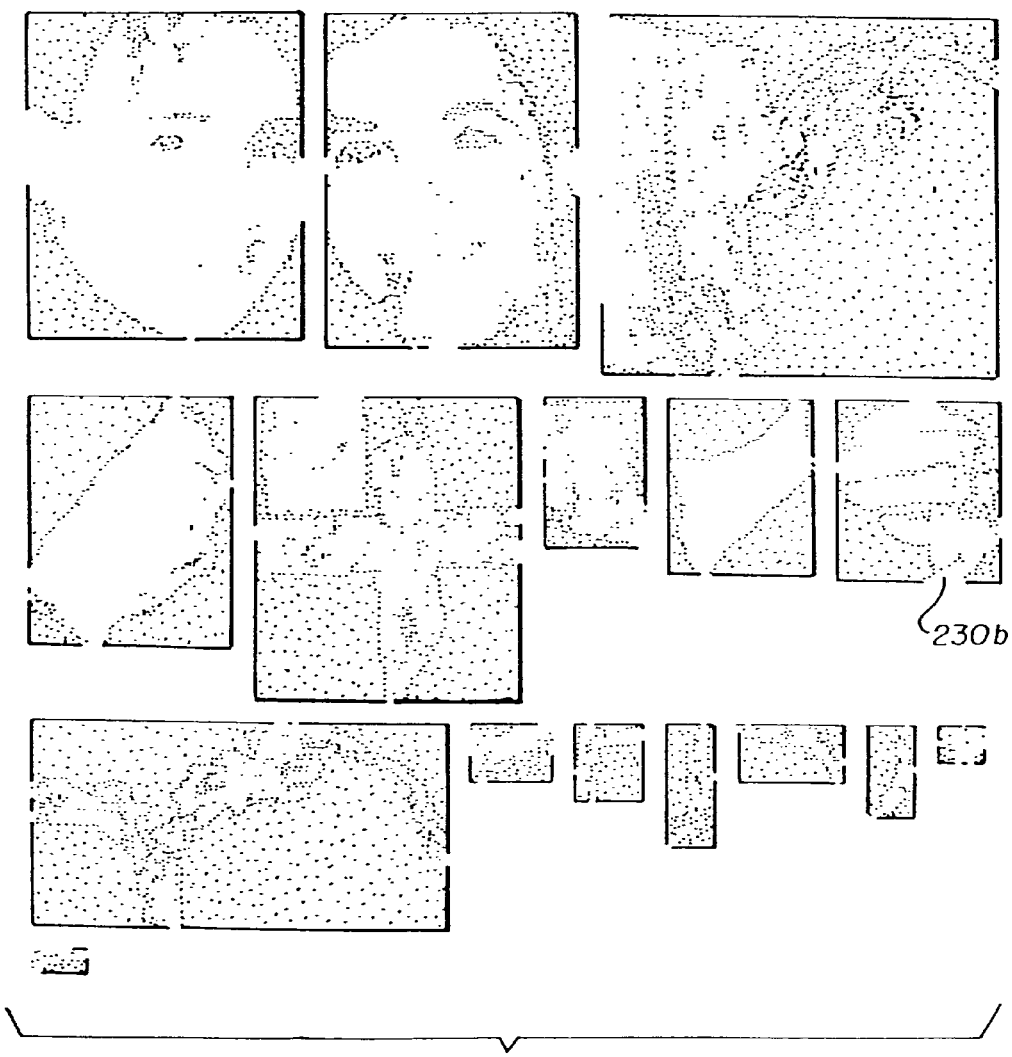
FIG. 10 shows detailed views of the individual continuous colored regions of FIG. 4.

Continuing to refer to FIG. 9, and as illustrated in FIG. 10, a sub-map of each skin colored region is formed by cutting out from the skin map (FIG. 4) the smallest rectangular section that contains all of that skin region S6. For example, skin region 230b in FIG. 10 corresponds to skin region 230a in FIG. 4. FIG. 10 shows the map of each separate continuous skin colored regions as an individual sub-map. The column and row of the skin map that correspond to the top left corner of the sub-map are referred to as $\text{Col}_{cutout}$ and $\text{Row}_{cutout}$, respectively. In the sub-map, code values of 255 (white) indicates that the pixel is located at a position at which skin color is present. A code value of 0 (black) indicates the absence of skin color.

Figure 11:
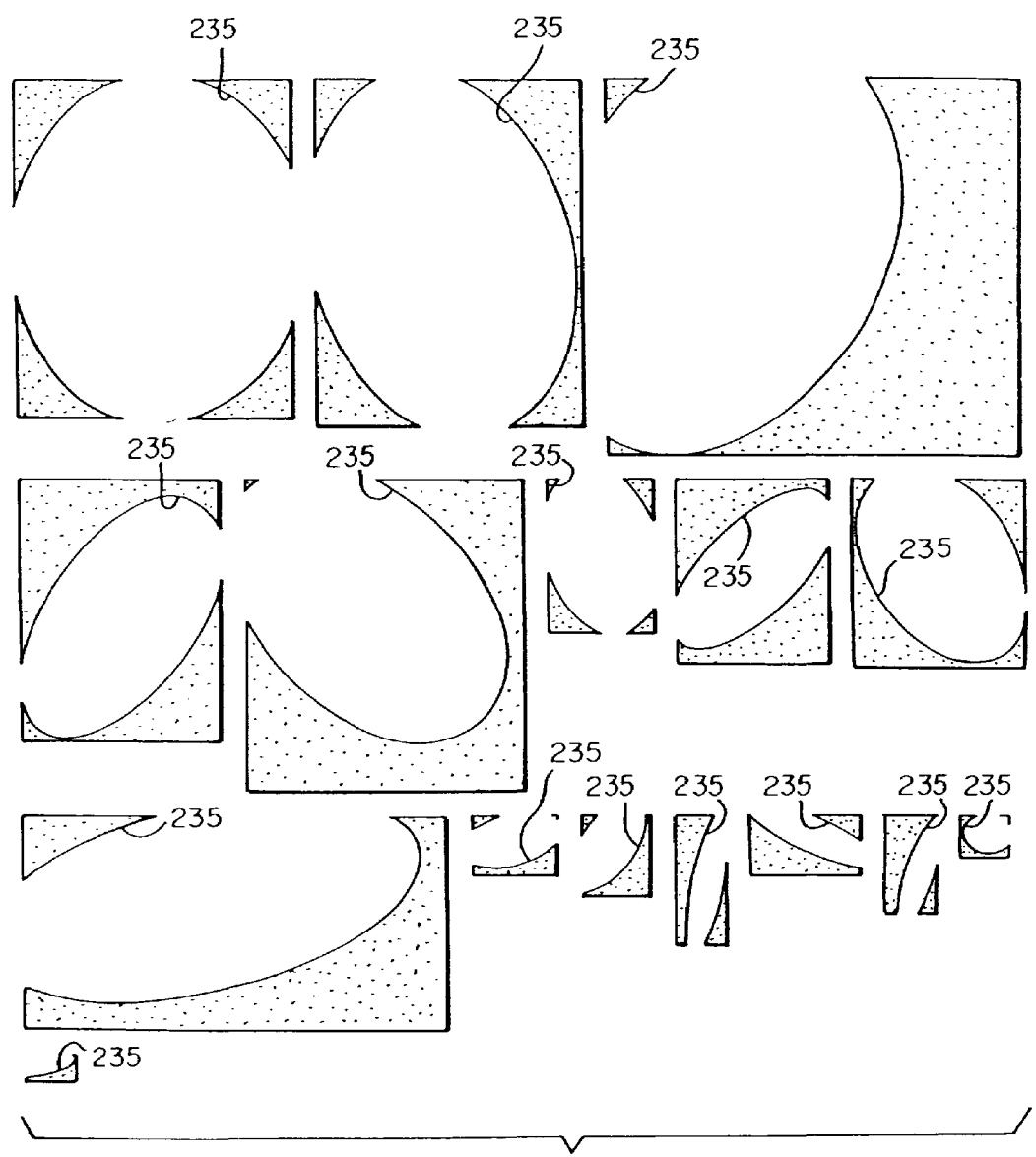
FIG. 11 shows diagrams of ellipses fitted to the views of FIG. 10.

Referring to FIG. 9, and as illustrated in FIG. 11, in the next step an ellipse 235 is fitted S8 to the individual skin color sub-maps found in step S6 (FIG. 10). A method of fitting an ellipse to a binary image is described in *Computer and Robot Vision*, Volume I. by Robert M. Haralick and Linda G. Shapiro, Addison-Wesley (1992), pp. 639–658. A human face is approximately elliptical. Therefore, if the skin color sub-map is of a human face, then the ellipse should fit the skin color map well and the minor axis of the ellipse should approximately equal the width of the face. A measure of the fit of an ellipse to the skin color sub-map is given by $$\text{Fit} = \frac{1}{2}\left(2 - \frac{N_{out}}{N} - \frac{A - N_{in}}{A}\right)$$

where N is the number of skin colored pixels (code value 255) in the map, $N_{out}$ is the number of skin colored pixels that fall outside the ellipse, $N_{in}$ is the number of skin colored pixels that are inside the ellipse, and A is the number of pixels in the ellipse. A is also referred to as the area of the ellipse. If all of the skin colored pixels are in the ellipse and the number of skin colored pixels equals the area of the ellipse then Fit is equal to one and the fit is perfect. When skin colored pixels fall outside of the ellipse or the area of the ellipse is greater than the number of skin colored pixels inside it then the value of Fit is diminished. If the value of Fit is less than a predetermined value MinEllipseFit which is set equal to 0.70 then we conclude that the skin colored region is not a face and we do not process it further S10.

Another indication of whether the skin color sub-map is of a face is the aspect ratio of the ellipse AspectRatio which is given by $$\text{AspectRatio} = \frac{D_{major}}{D_{minor}}$$

where $D_{major}$ is the major axis of the ellipse and $D_{minor}$ is the minor axis in pixels. If AspectRatio is greater than MaxAspectRatio which is set equal to 3.0 the skin colored region corresponds to an object in the image that is too long and thin to be a face. The program determines that the skin colored region is not a face and does not process it further S10.

Figure 12:
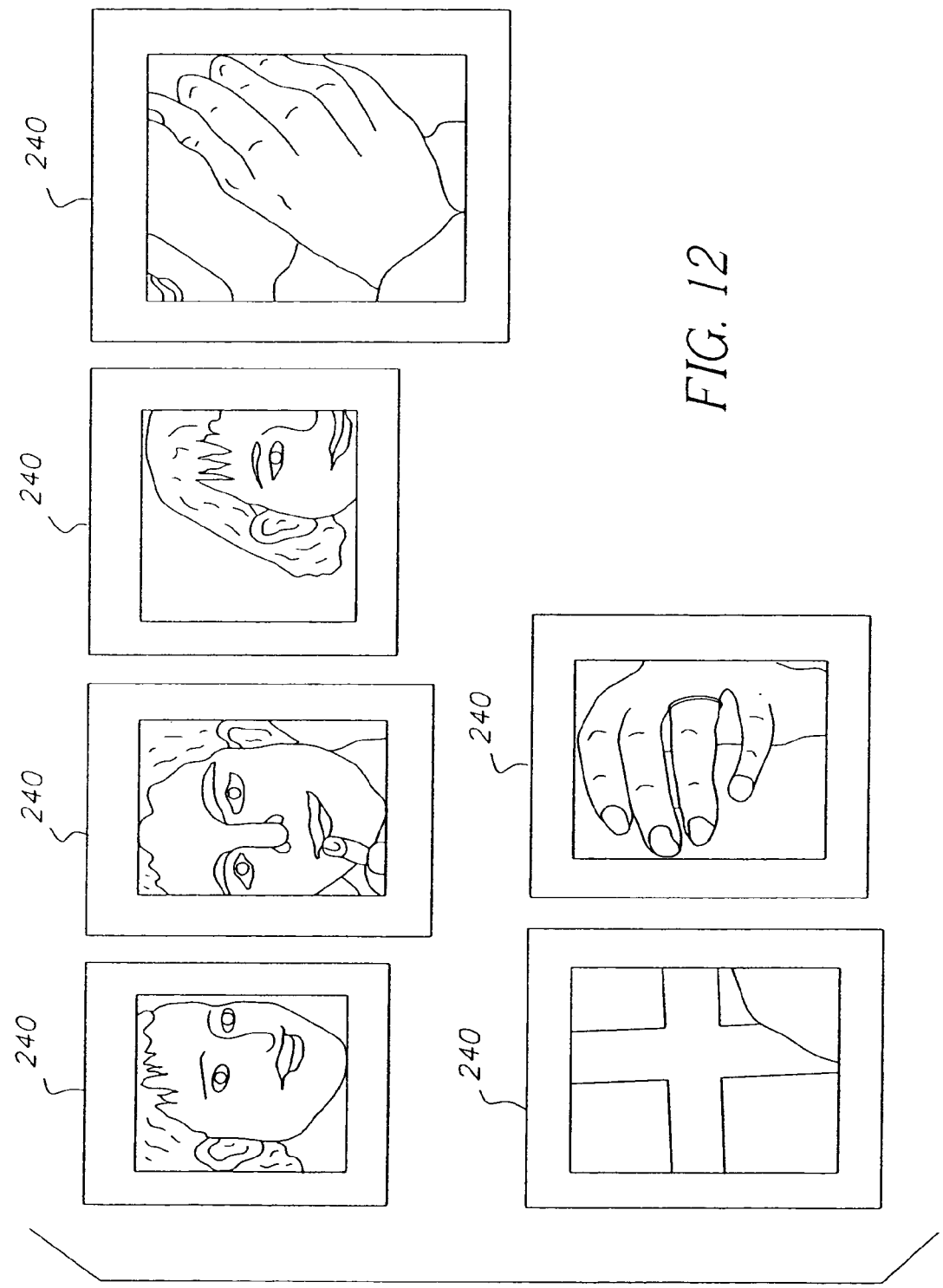
FIG. 12 illustrates resized candidate face regions.
Figure 13:
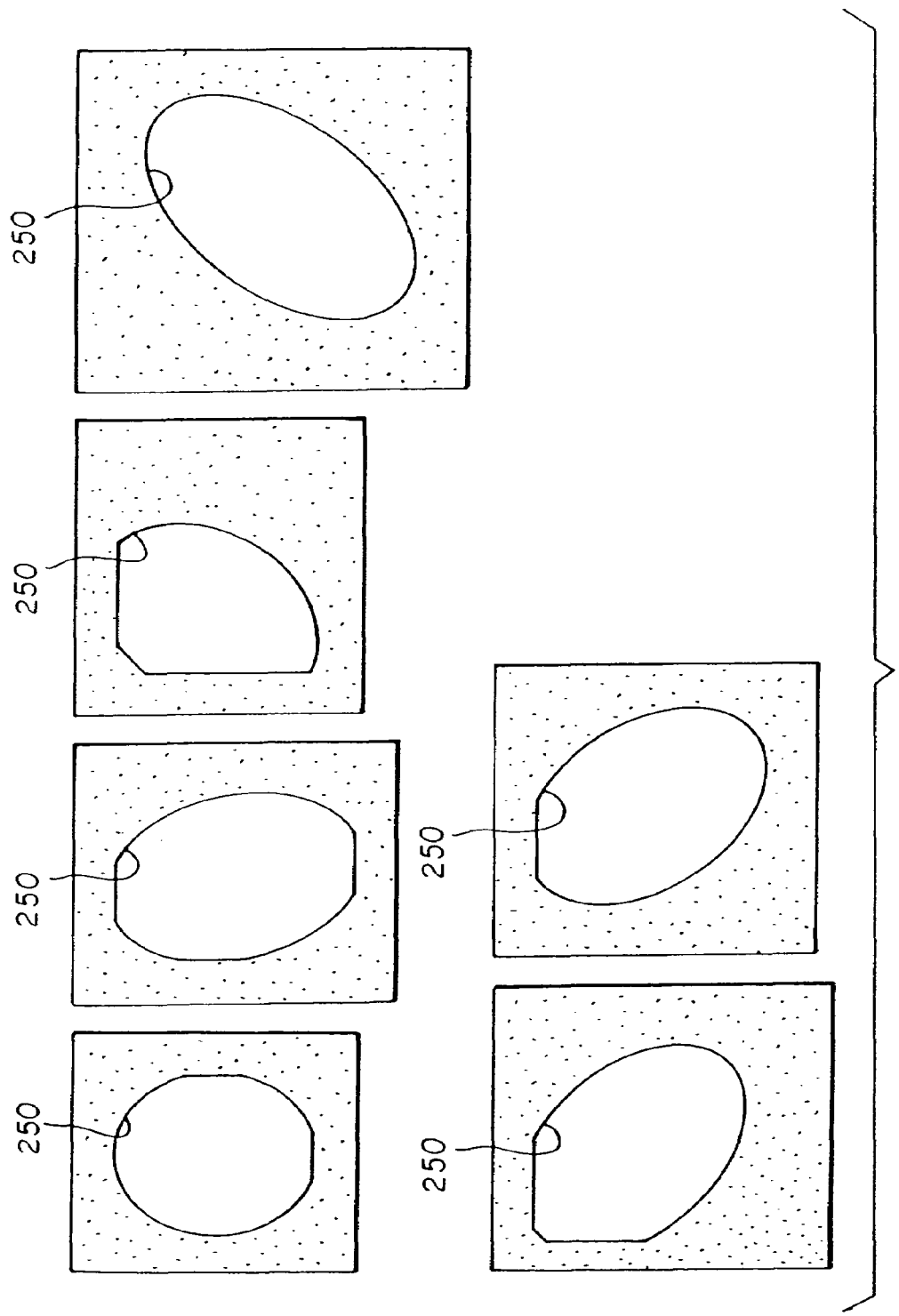
FIG. 13 is a diagram of resized ellipses corresponding to the candidate face regions fitted to FIG. 12.

If the skin sub-map has an acceptable degree of fit to an ellipse and the ellipse has an acceptable aspect ratio, the map potentially indicates the position of a face. Next, we calculate a resize factor $S_{prescale}$ which is given by the following equation $$S_{prescale} = \frac{AimEyeDistance \times FaceWidthEyeDistanceRatio}{D_{minor}}$$

where AimEyeDistance which is set equal to 75 pixels is the desired distance between eyes, and FaceWidthEyeDistanceRatio which is set equal to 2.0 is the ratio between the width and eye distance for a typical face. If $S_{prescale}$ is less than MinPrescale 0.10 or greater than MaxPrescale 1.50 the skin colored region is not processed further S10. The next step is to cut-out from the color image a sub-color-image that corresponds exactly to the location of the sub-map S12. If the minor axis of the ellipse is approximately equal to the width of the face then the distance between the eyes in the face should be close to AimEyeDistance. FIG. 12 shows the sub-color-images 240 after they have been resized in this manner. It is instructive to note that FIG. 12 is illustrated as a gray scale drawing, although the actual image is a color image. FIG. 13 shows the ellipses 250 that correspond to each of these sub-color-images that have also been resized S14. In practice, it is desirable to add extra rows and columns to the edges of the resized sub-color-images and sub-maps so that when these images are processed further an out-of-bounds pixel is not addressed. The top and bottom of the images are padded with Pad rows and the left and right side with Pad columns.

Figure 14:
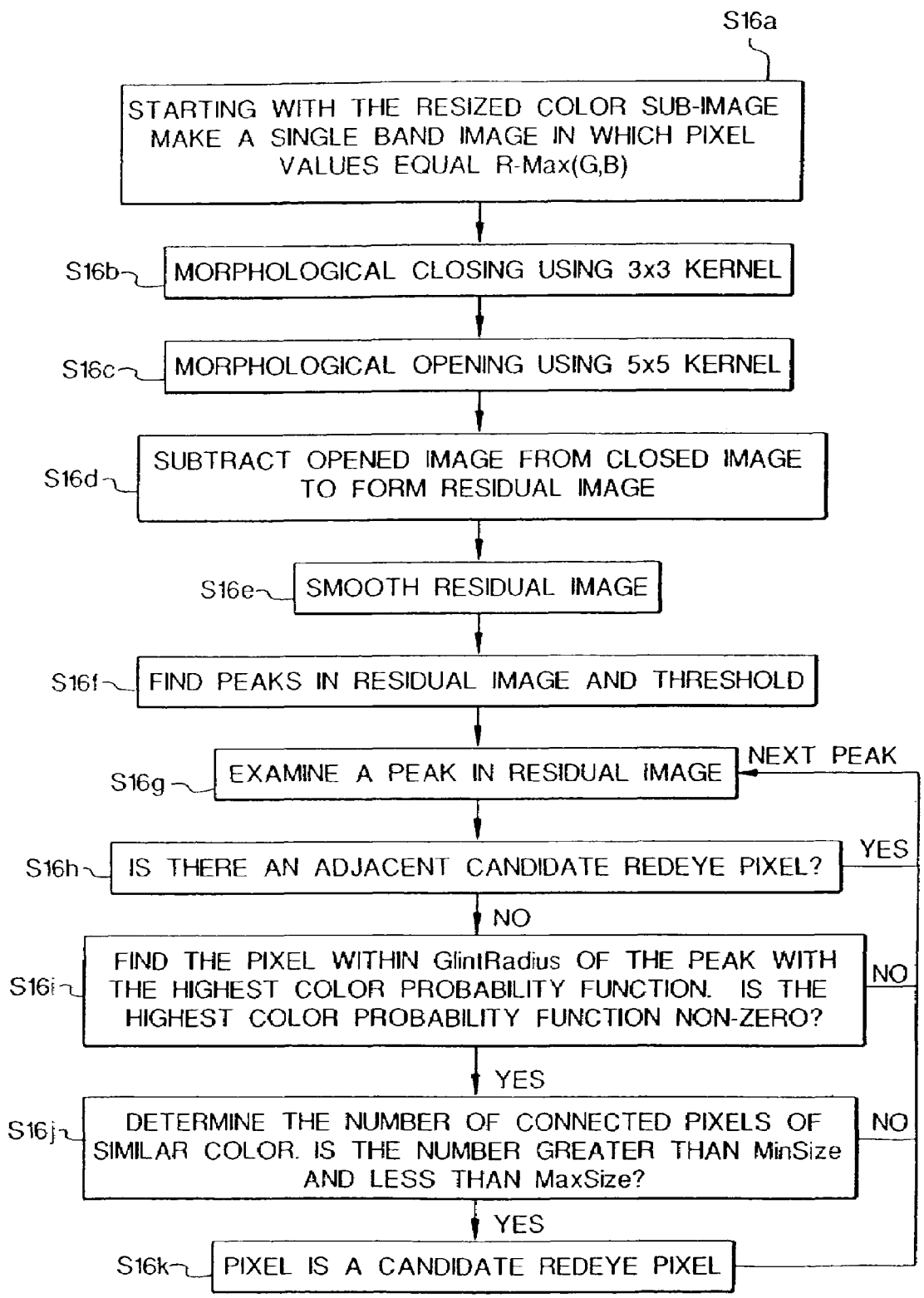
FIG. 14 is a detailed flowchart of the candidate redeye determination portion of FIG. 9.

Now that skin colored regions that have the shape of a face have been identified, the location of candidate redeyes need to be identified S16, which is illustrated in detail in FIG. 14. Now referring to FIG. 14, the sub-color-images 240 are processed so as to identify small red features. The program begins by defining a new single band image S16a with pixel values X given by $X = R - \text{Max}(G, B)$ where R, G, and B, are the red, green, and blue code value of the sub-color-image, respectively.

Redeyes in the new image will appear as small elliptical areas of high code value possibly with a small low code value region in the middle that is due to glint in the pupil. The affect of glint is removed by performing a gray scale morphological closing S16b using a W_close×W_close kernel, for example a 3×3 kernal although other sizes may also be used. Gray scale morphological operations are disclosed in *Image Analysis and Mathematical Morphology*, Volume 1, by Jean Serra, Academic Press (1982), pp. 424–478. Next, the small regions of high code value are removed by a gray scale morphological opening operation using a W_open× W_open kernel, for example a 5×5 kernal although other sizes may also be used S16c. The opened image is then subtracted from the closed image in order to form a residual image S16d. This image shows what was in the opened image, but not in the closed image. Namely, small regions of high code value which correspond to small red features in the sub-color-image. Next, the residual image is smoothed S16e with a linear filter having the kernel shown below.

1 2 1
2 4 2
1 2 1

Figure 15:
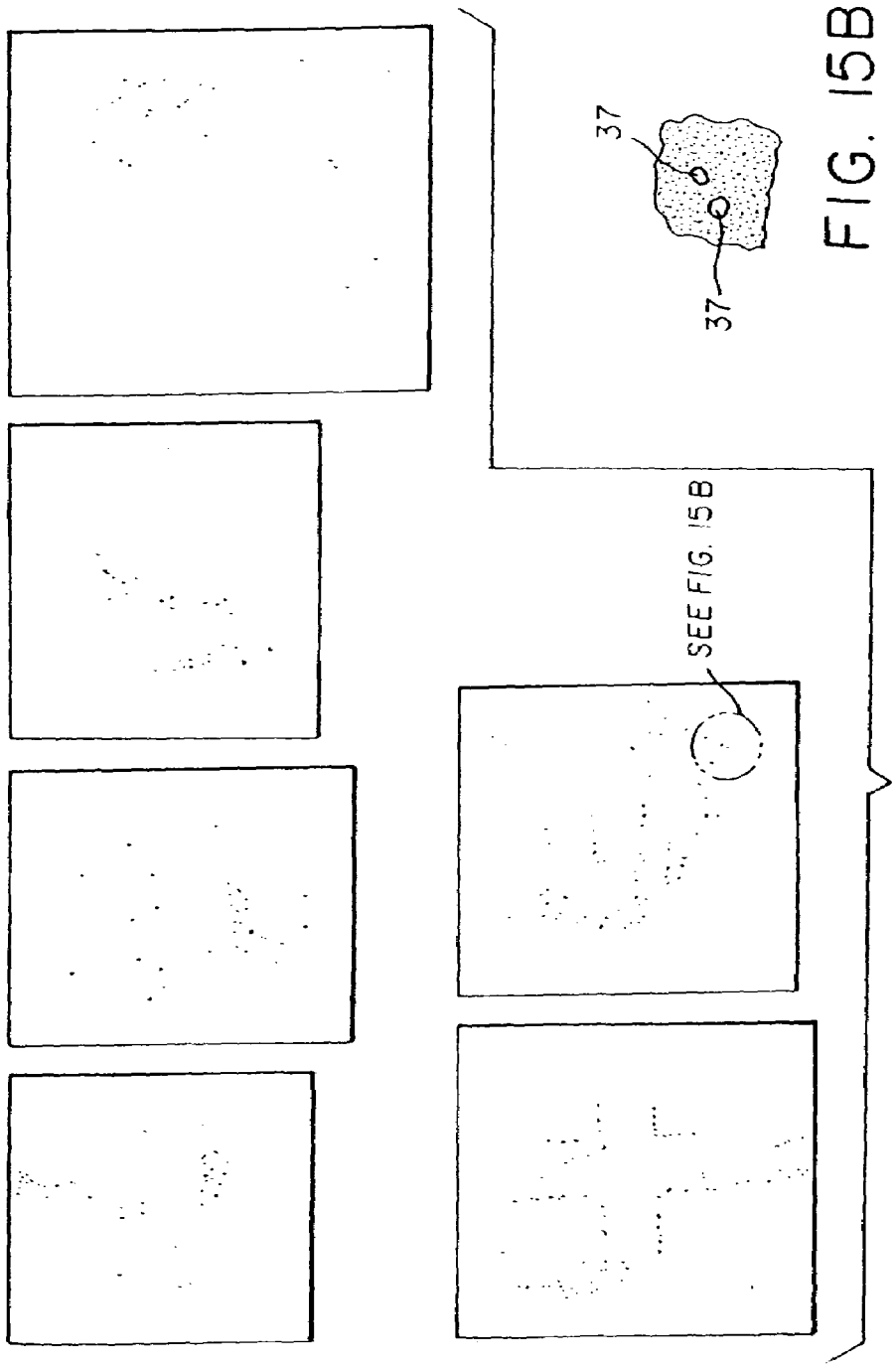
FIG. 15 illustrates the candidate redeye defects of FIG. 12.

For each pixel in the smoothed residual image, a 7×7 window centered at that pixel is examined. If the code value of that pixel exceeds the threshold Tpeak which is set equal to 5 and is greater than or equal to the code value of all the other pixels in the window, that pixel is classified as a peak S16f. FIG. 15 shows the peaks 237 for all of the sub-color-images in FIG. 12. After all the peaks in the smoothed residual image have been found the individual peaks are examined S16g. First, if a pixel has been classified as a peak and a neighboring pixel that is west, north-west, north, or north-east of this pixel has also been classified as a peak, the peak is eliminated S16h.

A pixel that has been classified as a peak is a candidate redeye pixel. It is possible however that the location of the peak coincides with glint in the pupil and not the red defect. For this reason, pixels within a distance GlintRadius equal to 2 from the peak are examined S16i. The candidate redeye pixel is moved to the nearby pixel with the highest color score $P_{color}$ which will be defined below.

Next, the candidate redeye pixel is used as a seed to grow a continuous region of pixels of similar color. If the number of pixels in the region is less than MinSize or greater than MaxSize the region is not of a size that is characteristic of a redeye defect and the candidate redeye pixel is eliminated S16j.

The result of the above processing is a map of candidate redeye pixels for each sub-color-image S16k. The ellipses in FIG. 13 are approximate maps of the region in the corresponding sub-color-images in FIG. 12 that have been identified as potentially being a face. Therefore, only the candidate redeye pixels that fall inside of the ellipse are considered in the next phase of eye detection, which is outlined in FIG. 16.

Referring back to FIG. 9, the purpose of eye detection is to determine whether the candidate redeye pixels are indeed part of an eye. The eye detection procedure requires a monotone version of the color image S18. The green band of the color image is used after the contrast is increased by transforming the green pixel code values using the equation $$G = 255 \left( \frac{G}{255} \right)^\gamma$$

where G is the code value of the green band and γ is a parameter which is set equal to 2.0. This monocolor version of the color image will be referred to as the luminance image.

Figure 17:
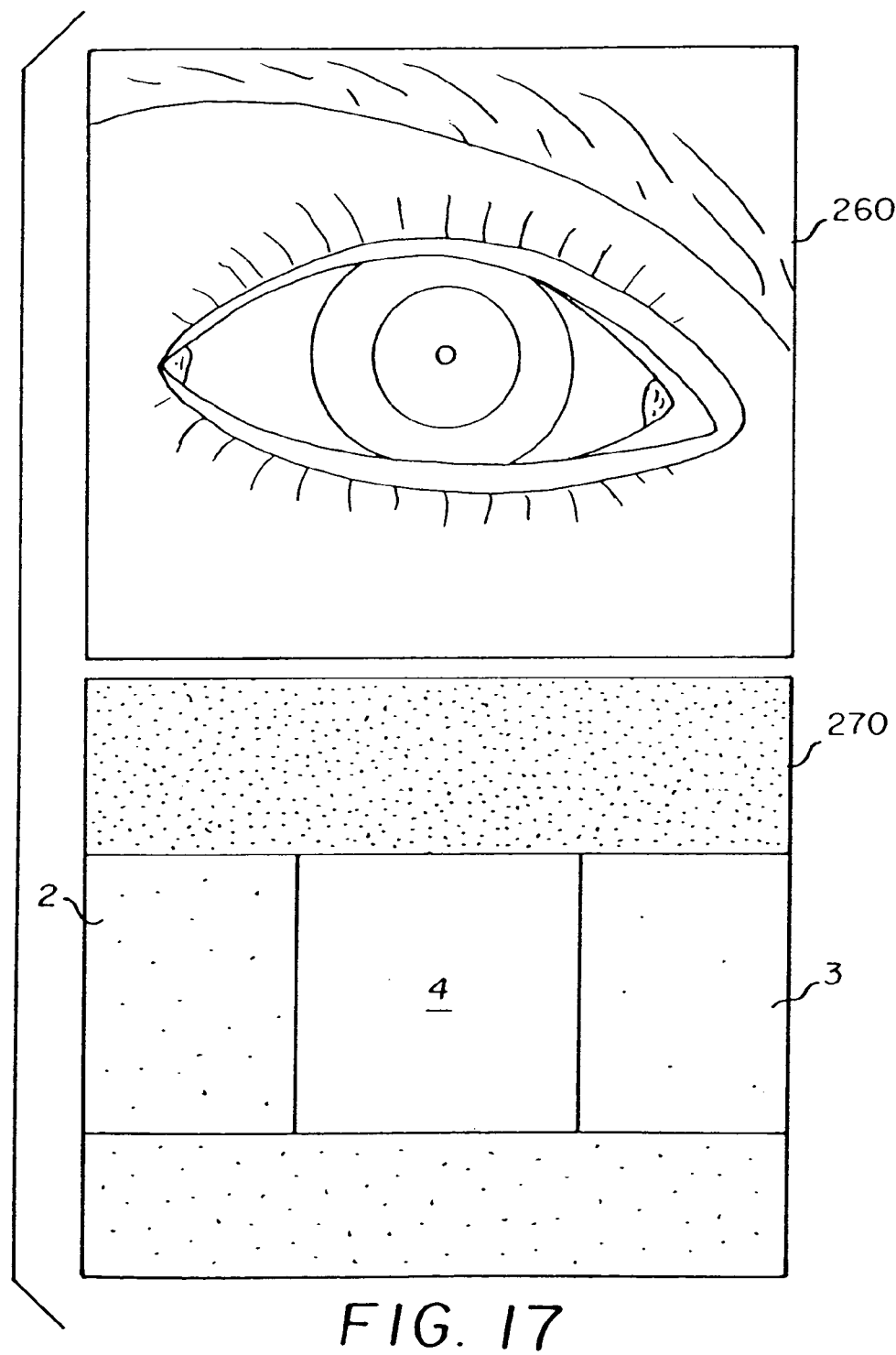
FIG. 17 illustrates an eye template, and zone map.

The eye detection procedure S20 in FIG. 9 is based on the process of template matching. It facilitates understanding to note that any image of an eye, or any combination of eye images, can be used as the template. The top image 260 in FIG. 17 shows a left-eye template. The bottom image 270 shows a division of the template into zones. Zone 1 is the eyebrow region. Zones 2 and 3 are the left and right sides of the eye, respectively. Zone 4 includes the pupil and iris. Zone 0 is not used. The eye template was taken from an image in which the distance between the eyes is TemplateEyeDistance equal to 306 pixels and the tilt of the two eyes is close to zero. As discussed above, a pair of redeyes in the resized color sub-images should be approximately a distance AimEyeDistance (75 pixels) apart. Therefore, in order for the template to be of the proper size to match an eye is must be resized by a factor of $$S_0 = \frac{AimEyeDistance}{TemplateEyeDistance}$$

In practice, the estimation of the face width from the minor axis of the ellipse will not always be accurate. Also, the eyes may be tilted. For this reason starting with the original left-eye template and the zone map, a collection of left-eye, right-eye (mirror image of left-eye), and zone maps are generated that span a range of sizes and orientations S22. The original eye template and zone map are resized from a factor of $S_0$x Narrow to $S_0$x Wide in increments of SStep.

Preferred values of Narrow, Wide, and Sstep are 1.5, 0.50, and 0.05, respectively. In order to accommodate tilt for each resize factor, a series of tilted templates and zone maps are generated that range from -MaxTilt degrees (clock-wise tilt) to MaxTilt degrees in increments of TStep degrees S22. The preferred value of MaxTilt is 30 degrees and of TStep is 2.0 degrees.

Figure 16:
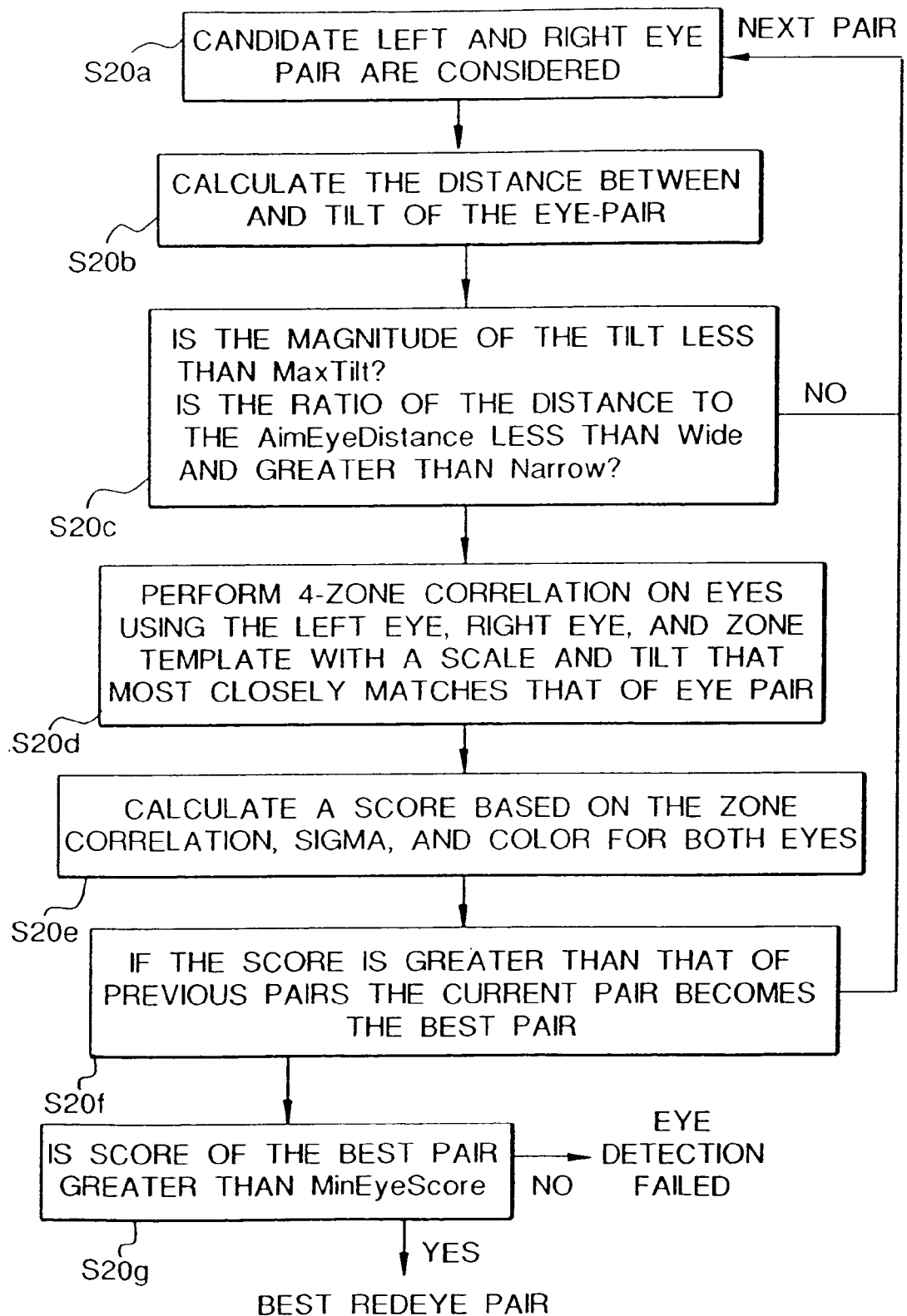
FIG. 16 is a detailed flowchart of the eye detection portion of FIG. 9.

Referring to FIG. 16, a detailed flowchart of step S20 of FIG. 9 is shown. A pair of candidate redeye pixels are considered that hypothetically belong to a left and right redeye pair S20a. The scale of the eye relative to the original eye template is related to the distance S20b between the candidate redeye pixel pair by the equation $$S_{pair} = \frac{((L_p - R_p)^2 + (L_l - R_l)^2)^{\frac{1}{2}}}{TemplateEyeDistance}$$

where $L_p$ ($R_p$) is the column of the left (right) candidate redeye pixel, $L_l$ ($R_l$) is the row of the left (right) candidate redeye pixel. (The column numbers begin with 1 and increase from left to right. The row numbers begin with 1 and increase from top to bottom.) The tilt S20b between the candidate redeye pixels is given by $$\text{Tilt} = \tan^{-1}\left(\frac{L_l - R_l}{R_p - L_p}\right)$$

As discussed above, an ensemble of eye templates and zone map templates were made that span a range of resize factors from $S_0 \times$Narrow to $S_0 \times$Wide with resolution SStep and with a tilt from -MaxTilt degrees to MaxTilt degrees with a resolution TStep. The left-eye template, right-eye template, and zone map that most closely match the value Of $S_{pair}$ and Tilt for the pair of candidate redeye pixels is used in the correlation step that follows. If $S_{pair}$ or Tilt are outside of this range, this pair is not processed further S20c.

After an eye template has been selected the next step is to determine if the region around the redeye pixel matches an eye. This is done by performing a correlation of the left-eye template with a region around the left candidate redeye pixel and the right-eye template with a region around the right candidate redeye pixel of the luminance image S20d. One step of the correlation process is to match up pixels of the template and luminance image and calculate the product of their code values. The center of the template images corresponds to the center of the eye. Since the candidate redeye pixels are close, but not necessarily at the center of an eye, we perform the correlation several times with the center of the template matched to all of the pixels within a square that extends a distance LookAround equal to 3 about the candidate redeye pixel. The correlation is performed separately for zones 1 through 4 of the template (see FIG. 17). These correlations are referred to as Cz1, Cz2, Cz3, and Cz4. In addition, an overall correlation is calculated for a region that consists of the sum of zones 1 through 4. This overall correlation is referred to as C. The pixel in the square around the candidate redeye pixel with the highest value of the overall correlation C is the best guess of the center of an eye which contains the candidate redeye pixel. This pixel is referred to as the eye-center pixel. Both the left and right candidate redeye pixels have an associated eye-center pixel.

The correlation process is now explained in detail. The template image is denoted by the function $\Phi(p,l)$ where p is the column number and l is the row number. The number of columns and rows in the template is w and h, respectively. The center of the eye template is approximately the location of the center of the eye. A zone of the template is correlated with the luminance image which we denote by $\Gamma(p, l)$ at column $p_O$ and row $l_O$ by calculating the product $\Pi$ given by.

$$\Pi = \frac{1}{N_z}\sum_{p \in Z}\sum_{l \in Z} \Gamma(p + p_o - w/2 - 1, l + l_o - h/2 - 1)\Phi(p, l)$$

where $p \in Z$ means that column is in zone Z, $l \in Z$ means that row l is in zone Z and $N_Z$ is the number of pixels in the zone. The mean code value of the template in zone Z given by $$M_\Phi = \frac{1}{N_z}\sum_{p \in Z}\sum_{l \in Z} \Phi(p, l)$$

is also calculated. In addition, the standard deviation of the template in zone Z is calculated according to the equation.

$$\sigma_\Phi = \left(\frac{1}{N_z}\sum_{p \in Z}\sum_{l \in Z}(\Phi(p, l) - M_\Phi)^2\right)^{\frac{1}{2}}$$

Similarly, we calculate the mean code value of the luminance image in zone Z using the equation $$M_\Gamma = \frac{1}{N_z}\sum_{p \in Z}\sum_{l \in Z} \Gamma(p + p_o - w/2 - 1, l + l_o - h/2 - 1)$$

and the standard deviation using the following equation $$\sigma_\Gamma = \left(\frac{1}{N_Z}\sum_{p \in Z}\sum_{l \in Z}(\Gamma(p + p_o - w/2 - 1, l + l_o - h/2 - 1) - M_\Gamma)^2\right)^{1/2}$$

Using the quantities defined above the correlation of the luminance image with the template in zone Z is given by the relation $$C_z = \frac{\Pi - M_\Phi M_\Gamma}{\sigma_\Phi \sigma_\Gamma}$$

If the code values of the image and the template are exactly the same in zone Z then $C_Z$ is equal to 1.0. If the image and the template are completely uncorrelated then $C_Z$ will be equal to zero.

Figure 18:
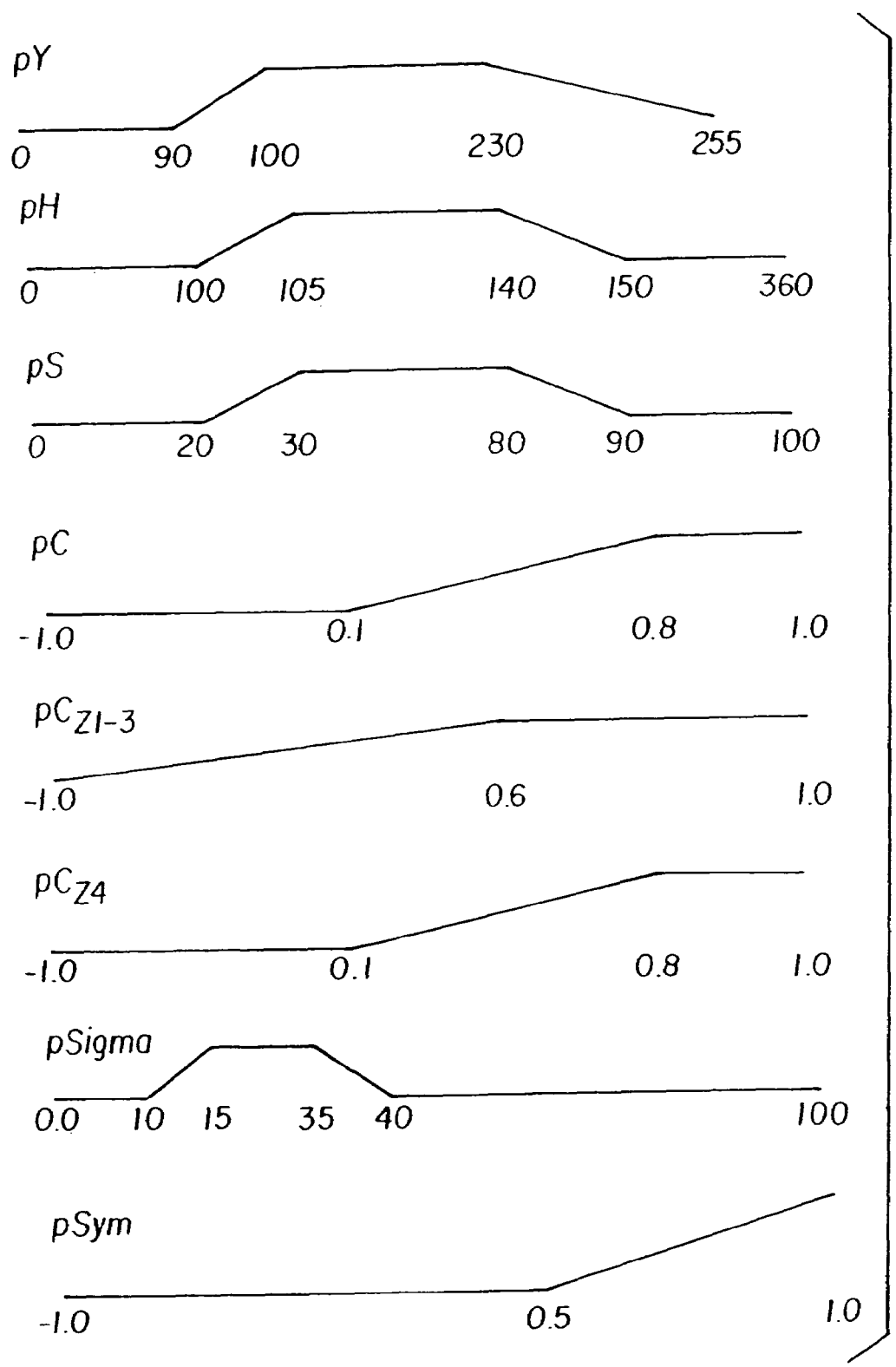
FIG. 18 illustrates scoring functions of the classifier shown in FIG. 9.

The values of C, $C_{Z1}$, $C_{Z2}$, $C_{Z3}$, and $C_{Z4}$ for the eye-center pixels are used in the calculation of a score that is a measure of the likelihood that the pair of candidate redeye pixels are part of a redeye defect in the sub-color-image S20e. Each of the correlations are used as a variable in an associated scoring function that ranges from 0.0 to 1.0. For example, the scoring function associated with the overall correlation C which we refer to as pC(C) is 0.0 if the value of C for an eye-center pixel indicates that it is very unlikely that the pixel actually is located at the center of an eye. On the other hand, if the value of C is in a range that is typical of the correlation of the template with an eye then pC(C) is 1.0. Otherwise pC(C) takes on an intermediate value. The scoring function pC(C) and other scoring functions described below are shown in FIG. 18.

Scores are defined based on these scoring functions which will be combined later into an overall score for a candidate redeye pair. The following equation defines a score $P_{corr}$ related to the overall correlation C as simply $$P_{corr} = pC(C)$$

The score $P_{zone}$ associated with the zone correlations is a weighted average of the zone correlation scoring functions. It has been found that the correlation in zone 4 (the pupil) is a much more reliable indicator of the presence of an eye than the other zones. For this reason it is given more weight than other zones. Typically we set the weight W equal to 6.0. $P_{zone}$ is given by $$P_{zone} = \frac{pC_{z1}(C_{Z1}) + pC_{z2}(C_{z2}) + pC_{z3}(C_{z3}) + WpC_{z4}(C_{z4})}{W+3}$$

It has been found that the standard deviation of the luminance image $\sigma_\Gamma$ that was calculated in the process of calculating the overall correlation C is a good indicator if the feature in the luminance image centered at the eye-center pixel is actually an eye. For instance, if $\sigma_\Gamma$ is very low then the feature is of too low contrast to be an eye. With this in mind we define a score associated with $\sigma_\Gamma$ by $$P_{sigma} = p\text{Sigma}(\sigma_\Gamma)$$

Finally, the color of the candidate redeye pixel must be indicative of a real redeye defect. For this calculation the red, green, and blue, code values of the candidate redeye pixel are converted into luminance (Lum), hue (Hue), and saturation (Sat) values. Luminance is calculated as follows $$Lum = \frac{Max(R, G, B) + Min(R, G, B)}{2}$$

The value of Lum for a pixel ranges from zero to the highest possible code value. The saturation given by $$Sat = 100 \frac{Max(R, G, B) - Min(R, G, B)}{Max(R, G, B)}$$

is a value ranging from 0 to 100. The hue is defined as in *Computer Graphics Principles and Practice* 2nd ed., Addison-Wesley Publishing Company, page 592, except the color red is shifted to a hue angle of 120 degrees. The value of Hue may range from 0 to 360 degrees. The score that is related to the color of the candidate redeye pixel is defined by $$P_{color} = pL(Lum)pH(Hue)pS(Sat)$$

The result is a score $P_{eye}$ which indicates the likelihood that a candidate redeye pixel is actually part of a redeye defect in the image. This score is defined by $$P_{eye} = P_{corr} P_{zone} P_{sigma} P_{color}$$

Its value is in the range of 0.0 to 1.0. The figure of merit $P_{eye}$ is calculated for both the left and the right candidate redeye pixels in a pair. The average of these two values is given by $$P_{pair} = \frac{P_{eye}^{Left} + P_{eye}^{Right}}{2}$$

The pair of candidate redeye pixels for which $P_{pair}$ is the largest is referred to as the best pair of candidate redeye pixels S20f. If $P_{pair}$ exceeds the threshold MinEyeScore equal to 0.05, then the program processes further. Otherwise, the program concludes that a pair of redeyes is not present in the sub-color-image S20g.

It is important to minimize false positive detection of redeye pairs by ensuring that the detected redeye pairs are indeed located within a human face region. In a preferred embodiment of the present invention, face verification 36, which is referred to in FIG. 1, is achieved by applying a face detector to the area surrounding the detected redeye pairs. If the face detector detects a face, the redeye pair is confirmed; otherwise the detected redeye pairs is treated as false alarm and eliminated. Human face detection is well known in prior art: For example, see B. Heisele, T. Poggio, M. Pontil, "Face Detection in Still Gray Images," MIT Artificial Intelligence Lab, Memo 1687, May 2000, or alternatively, U.S. Pat. No. 5,710,833 by Moghaddam and Pentland ("Detection, recognition and coding of complex objects using probabilistic eigenspace analysis"). Following face verification 36, the list 38 of redeyes is produced and correction may be initiated on the list of redeyes in the redeye correction stage 40. Such a correction may involve substituting a more neutral color, such as black, for the red pixels in order to provide a more desirable and aesthetically pleasing rendition of the eye pupil color.

One less computationally expensive method of confirming that a pair of redeyes has indeed been located is to use the fact that a human face is approximately symmetric about a line that bisects the face S24 in FIG. 9. In order to do this, the sub-color-image is rotated so that the tilt of a line connecting the best pair of candidate redeye pixels is equal to zero. Next, an image centered at the midpoint between the eyes is cut-out of the sub-color-image. This image has a width of 1.5 times the distance between the candidate redeye pixels and a height equal to a quarter of its width. This image is in turn cut in half. The left half-image we refer to as $E^x_{left}(p,l)$ and the right half-image by $E^x_{right}(p,l)$ where the superscript x refers to a band of the color image. For example, $E^r_{left}(p,l)$ refers to the red band of the image. The columns in the right half-image are inverted (the first column becomes the last column, etc.) so that it becomes a mirror image of itself. A correlation of $E^x_{left}(p,l)$ and $E^r_{right}(p,l)$ is performed by first calculating the sum of products $$\Pi^x_{sym} = \frac{1}{N} \sum_p \sum_l E^x left(p, l) E^x right(p, l)$$

where the summations over p and l are over all of the columns and rows in the half-images, respectively, and N is the number of pixels in the half-images. The correlation is given by $$C_{sym}^x = \frac{\Pi_{sym}^x - M_{left}^x M_{right}^x}{\sigma_{left}^x \sigma_{right}^x}$$

where $M^x_{left}$ and $M^x_{right}$ are the mean code values of band x of the half-images and $\sigma^x_{left}$ and $\sigma^x_{right}$ are the standard deviations. A score $P_{sym}$ is defined based on a symmetry scoring function $pSym(C^x_{sym})$ by $$P_{sym} = pSym(C^r \text{ sym}) pSym(C^g \text{ sym}) pSym(C^b \text{ Sym})$$

The final score P is simply the product of $P_{sym}$ and $P_{pair}$.

$$P = P_{sym} P_{pair}$$

If this score, which may range between 0.0 and 1.0, exceeds a threshold MinScore which is set equal to 0.05 S26, then the candidate redeye pixel pair is assumed to mark the location of a pair of redeye defects in the resized sub-color-image.

Finally, the positions of the left and right redeye defects in the original color image are calculated based on the position of the left and right candidate redeye pixels in the resized sub-color-image using the relations $$p' = \frac{p - Pad}{S_{prescale}} + Col_{cutout} - 1$$

$$l' = \frac{l - Pad}{S_{prescale}} + Row_{cutout} - 1$$

where p and l are the column and row of the left candidate redeye pixel in the resized sub-color-image and p' and l' are the corresponding positions in the original color image S28.

It sometimes happens that two different skin colored regions after being fitted to an ellipse will overlap or be very close together. This may result in the same redeye pair being found twice or the detection of two redeye pairs that are too close together for both to be truly a pair of redeyes. For this reason, after all the redeye pairs in the color image have been located it is determined if any two pairs have redeye locations less than MinInterpairEyeDistance equal to 20 pixels apart. If this is the case the pair with the lower score is eliminated S30.

The present invention can be applied to detecting objects other than human faces and red eyes, for example, horses. Forsyth and Fleck describe a system for detecting horses in digital images ("Body Plans", *Proceedings of IEEE International Conference on Computer Vision and Pattern Recognition*, 1997). This system relies on segmentation of an image into candidate horse regions using color and texture criteria and then assembles extended segments or regions using a so-called "body plan" to support the related geometric reasoning. This body plan is essentially a model of the topology of the body of a horse. The detection rate of this horse detecting system can be improved by the present invention. Specifically, because Forsyth and Fleck used only an object-specific segmentation map, adding a non-object specific segmentation map increases the likelihood that regions corresponding to horses are properly extracted from an image and in turn increases the likelihood of correctly detecting horses. A non-object specific segmentation map using color and texture criteria can be obtained using a segmentation method that is based on both color and texture properties (see "Markov Random Filed Models for Unsupervised Segmentation of Textured Color Images" by Panjwani and Healey, *IEEE Transactions on Pattern Analysis and Machine Intelligence*, vol. 17, no. 10, October 1995, pp. 939–954.) Similar to face blob detection, either a merged segmentation map is used for pattern matching against a pre-determined body plan of a horse, or the two segmentation maps are used to find horses respectively and the detected results are merged to produce the most complete extraction of horse regions, and to eliminate redundant detection.

The subject matter of the present invention relates to digital image understanding technology, which is understood to mean technology that digitally process a digital image to recognize and thereby assign useful meaning to human understandable objects, attributes or conditions and then to utilize the results obtained in the further processing of the digital image.

The invention has been described in detail with particular reference to certain preferred embodiments thereof, but it will be understood that variations and modifications can be effected within the spirit and scope of the invention.

What is claimed is:

1. A method for detecting objects in a digital image, comprising the steps of:
   a) generating a first segmentation map of the digital image according to a non-object specific criterion;
   b) generating a second segmentation map of the digital image according to a object specific criterion; and
   c) detecting objects in the digital image using both the first and second segmentation maps.

2. The method claimed in claim 1, further comprising the step of merging the first and second segmentation maps prior to the detecting step and detecting the objects in the merged map using pattern matching.

3. The method claimed in claim 1, further comprising the step of detecting objects using pattern matching in the first and second segmentation maps respectively and merging the detected objects.

4. The method claimed in claim 1, wherein the non-object specific criterion is a color homogeneity criterion and the object specific criterion is an object specific color similarity.

5. The method claimed in claim 4 for detecting skin regions, wherein at least one of the color homogeneity criterion and the object specific color similarity relates to a skin color, and the detected objects are detected skin color regions.

6. The method claimed in claim 5 further comprising the step of detecting red-eye in the detected skin color regions.

7. The method claimed in claim 6, wherein the step of detecting red eye comprises the steps of:
   a) identifying candidate redeye defects in skin colored regions having a characteristic of a face and having groups of pixels with a color characteristic of a redeye defect; and
   (b) evaluating the candidate redeye defects relative to one or more properties of a face to determine whether a pair of the candidate redeye defects is consistent with a size expected of an eye based on a distance between the pair of candidate redeye defects.

8. The method claimed in claim 7, further comprising the step of correcting color of pixels based on a location of the redeye defects.

9. The method claimed in claim 1, wherein the step of generating a first segmentation map comprises segmenting the digital image into continuous regions of homogeneous color and assigning a score indicating a probability that a region corresponds to objects being detected.

10. The method claimed in claim 1, wherein the step of generating a second segmentation map comprises the steps of:
   a) detecting object pixels in the digital image by assigning an object belief value to each pixel;
   b) applying a threshold to the belief values to identify object pixels;
   c) extracting continuous regions of object pixels;
   d) growing the extracted continuous regions according to a continuity criterion for belief values; and
   e) decomposing the grown regions into parts of simple shapes to generate the second segmentation map.

11. The method claimed in claim 10 wherein the step b) of applying a threshold to the belief values to identify object pixels comprises the steps of:
   a) forming a probability distribution of at least some of the belief values of the pixels in the digital image;
   b) determining an adaptive threshold from the probability distribution; and
   c) applying the adaptive threshold to the belief values.

12. The method claimed in claim 11 wherein the adaptive threshold is determined from a probability distribution of belief values for pixels that are on or around a boundary between one or more objects and a background in the image.

13. The method claimed in claim 10 wherein the step b) of applying a threshold to the belief values to identify object pixels comprises the steps of:
   a) forming a probability map of the belief values of the pixels in the digital image;
   b) determining a gradient of the probability map for each pixel;
   c) constructing a histogram using only high-gradient pixels;
   d) determining the adaptive threshold from one or more valleys located in the histogram; and
   e) applying the adaptive threshold to the belief values.

14. The method claimed in claim 10 wherein the step e) of decomposing the grown regions comprises the steps of:
   a) following a contour of each region;
   b) smoothing the contour to remove noisy structures;
   c) finding critical points of high curvature along the smoothed contour;
   d) identifying negative curvature critical points and, for one or more of the negative curvature critical points, choosing another contour point to form a cut; and
   e) splitting regions at the cuts to produce the simple shapes.

15. A computer storage medium having instructions stored therein for causing a computer to perform the method of claim 1.

16. A system for detecting objects in a digital image, said system comprising:
   a) a first stage for generating a first segmentation map of the digital image according to a non-object specific criterion;
   b) a second stage for generating a second segmentation map of the digital image according to a object specific criterion; and
   c) a detector for detecting objects in the digital image using both the first and second segmentation maps.

17. The system claimed in claim 16, further comprising a stage for merging the first and second segmentation maps, wherein the detector detects the objects in the merged map using pattern matching.

18. The system claimed in claim 16, wherein the non-object specific criterion is a color homogeneity criterion and the object specific criterion is an object specific color similarity.

19. The system claimed in claim 18 wherein at least one of the color homogeneity criterion and the object specific color similarity relates to a skin color, and the detected objects are detected skin color regions.

20. The system claimed in claim 19 wherein the detector further detects red-eye in the detected skin color regions.

21. The system claimed in claim 20 further comprising a correction stage for correcting color of pixels based on a location of the redeye defects.

22. The system claimed in claim 16 wherein the second stage includes an algorithm for:
   a) detecting object pixels in the digital image by assigning an object belief value to each pixel;
   b) applying a threshold to the belief values to identify object pixels;
   c) extracting continuous regions of object pixels;
   d) growing the extracted continuous regions according to a continuity criterion for belief values; and
   e) decomposing the grown regions into parts of simple shapes to generate the second segmentation map.

23. The system claimed in claim 22 wherein applying a threshold to the belief values to identify object pixels comprises:
   a) forming a probability distribution of at least some of the belief values of the pixels in the digital image;
   b) determining an adaptive threshold from the probability distribution; and
   c) applying the adaptive threshold to the belief values.

24. The system claimed in claim 23 wherein the adaptive threshold is determined from a probability distribution of belief values for pixels that are on or around a boundary between one or more objects and a background in the image.

25. The system claimed in claim 22 wherein applying a threshold to the belief values to identify object pixels comprises:
   a) forming a probability map of the belief values of the pixels in the digital image;
   b) determining a gradient of the probability map for each pixel;
   c) constructing a histogram using only high-gradient pixels;
   d) determining the adaptive threshold from one or more valleys located in the histogram; and
   e) applying the adaptive threshold to the belief values.

26. The system claimed in claim 22 wherein decomposing the grown regions comprises:
   a) following a contour of each region;
   b) smoothing the contour to remove noisy structures;
   c) finding critical points of high curvature along the smoothed contour;
   d) identifying negative curvature critical points and, for one or more of the negative curvature critical points, choosing another contour point to form a cut; and
   e) splitting regions at the cuts to produce the simple shapes.

* * * * *